US012719637B2

(12) United States Patent
Huang et al.

(10) Patent No.: US 12,719,637 B2
(45) Date of Patent: Aug. 25, 2026

(54) NON-COHERENT TRANSMISSION DIVERSITY COMMUNICATIONS

(71) Applicant: QUALCOMM Incorporated, San Diego, CA (US)

(72) Inventors: Yi Huang, San Diego, CA (US); Wei Yang, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 688 days.

(21) Appl. No.: 18/145,802

(22) Filed: Dec. 22, 2022

(65) Prior Publication Data

US 2024/0214156 A1 Jun. 27, 2024

(51) Int. Cl.
*H04L 5/00* (2006.01)

(52) U.S. Cl.
CPC .......... *H04L 5/0053* (2013.01); *H04L 5/0007* (2013.01)

(58) Field of Classification Search
None
See application file for complete search history.

(56) References Cited

U.S. PATENT DOCUMENTS

2021/0092734 A1* 3/2021 Yang ..................... H04L 5/0032
2021/0336662 A1* 10/2021 Huang .................. H04L 5/0012
2022/0190892 A1* 6/2022 Park ........................ H04L 27/26
2023/0275794 A1* 8/2023 Liang .................. H04L 27/2614 370/330
2023/0283437 A1* 9/2023 Liang .................... H04L 5/0053 370/329
2024/0163905 A1* 5/2024 Rastegardoost ...... H04W 72/25

* cited by examiner

*Primary Examiner* — Khaled M Kassim
*Assistant Examiner* — Ahmed Saifuddin
(74) *Attorney, Agent, or Firm* — Holland & Hart LLP

(57) ABSTRACT

A method of transmission of a set of I bits of information stream is described, in which said method comprises: selecting, from a pool of at least $2^I$ matrices, a matrix to uniquely represent the set of I bits of information stream, wherein each matrix of the pool is a set of M vectors, and each vector is of length D; and transmitting a resource block across M transmit antennas, wherein respective vectors of the M vectors are transmitted on respective transmit antennas of the M transmit antennas. The transmitting comprises mapping respective entries of the respective vectors to respective resource elements of the resource block.

30 Claims, 22 Drawing Sheets

400

Find a set of $2^n$ matrices with max auto-correlation and minimum cross-correlation. Use Gold sequence for each vector in respective matrices.

NON-COHERENT TRANSMISSION DIVERSITY COMMUNICATIONS

TECHNICAL FIELD

The following relates generally to wireless communications and more specifically to non-coherent transmission diversity communications.

BACKGROUND

Reference signals are predefined signals occupying specific resource elements within a time-frequency grid. New Radio (NR) includes several types of reference signals transmitted in different ways, and are intended to be used for different purposes by a receiving device. Different reference signals can be optimized for their specific purpose, providing very "lean" signals, as the different reference signals may be transmitted only when needed. For example, demodulation reference signals (DMRS) are intended for channel estimation as part of coherent demodulation. They can be included in a physical downlink shared channel (PDSCH) for channel estimation by a user equipment (UE). Similarly, the DMRS for PUSCH allows next-generation NodeBs or giga-NodeBs (either of which may be referred to as a gNB) to coherently demodulate the PUSCH.

Examples of DMRS include: phase-tracking reference signals (PT-RS) for phase-noise compensation; CSI reference signals (CSI-RS), which are downlink reference signals intended to be used by devices to acquire downlink channel-state information (CSI); Tracking reference signals (TRS), which are sparse reference signals intended to assist the device in time and frequency tracking; and sounding reference signals (SRS), which are uplink reference signals transmitted by UEs and used for uplink channel-state estimation at the base stations.

The DMRS in NR provides flexibility to cater for different deployment scenarios and use cases: a front-loaded design (with demodulation reference signals early in the transmission) can enable low latency, support for many orthogonal antenna ports for multiple-input multiple-output (MIMO), transmissions durations of variable symbol length (e.g. from 2 to 14 symbols), and multiple reference-signal instances per slot (e.g. up to 4) to support very high-speed scenarios.

DMRS represents overhead, because it takes up resources otherwise available for data transmission. There is interest in DMRS-less transmission. An example is for a UE travelling with low velocity or in static state. For example, DMRS may be included in some of the PUSCH slots, while there is no DMRS in other PUSCH slots. The reduced DMRS symbols may then be utilized to transmit PUSCH. There is also a need for non-coherent DMRS-less PUCCH. In non-coherent demodulation, the phase angle of the signal being demodulated is unknown. It may, for example, be assumed to have a mean around a known transmitted phase, or there may be other ways to eliminate phase uncertainty.

In the case of uplink control information (UCI), such information is of limited size, typically occupying one, two or only a few resource elements. It may comprise, for example, just 11 bits (i.e. more generally N bits). An alternative scheme may be considered for reliably demodulating UCI in a non-coherent manner.

SUMMARY

The described techniques herein may relate to configuring a communication device (e.g. a base station, and/or a user equipment (UE)) to support non-coherent transmission diversity communications in systems that are configured for 3G, 4G, new radio (e.g. 5G NR) wireless technologies, and/or other types of radio-based wireless technologies (e.g. IEEE 802.11x protocol family). In particular, the communication device is, at least, to be configured with multiple antennas to enable multiple-input multiple-output (MIMO) communications to thereby support non-coherent transmission diversity communications.

According to a $1^{st}$ aspect, there is disclosed a method of transmission of a set of I bits of information stream, comprising: selecting, from a pool of at least $2^I$ matrices, a matrix to uniquely represent the set of I bits of information stream, wherein each matrix of the pool is a set of M vectors, and each vector is of length D; and transmitting a resource block across M transmit antennas, wherein respective vectors of the M vectors are transmitted on respective transmit antennas of the M transmit antennas, and the transmitting comprises mapping respective entries of the respective vectors to respective resource elements of the resource block.

In an example, each matrix of the pool may be derived from at least one Gold sequence.

In an example, each matrix of the pool may be derived from a Gold sequence of length D multiplied by a matrix Q of dimension D×M, wherein the multiplication expands the Gold sequence of the length D into a matrix of dimension D×M.

In an example, D is defined to be 168 and M is defined to be 2, and the matrix Q is defined as:

$$Q = \begin{bmatrix} 1 & 1 \\ 1 & -1 \\ \vdots & \vdots \\ 1 & 1 \\ 1 & -1 \end{bmatrix}.$$

In an example, each matrix of the pool may be derived by selecting M unique Gold sequences from a plurality of Gold sequences, and each Gold sequence is of length D.

In an example, each matrix of the pool may be derived from a Gold sequence of length R being of 2D, which is divided into M parts of length D respectively to obtain the associated matrix.

In an example, D may be configured to correspond to a number of resource elements in the resource block across all available orthogonal frequency-division multiplexing (OFDM) symbols.

In an example, each matrix of the pool may comprise a plurality of sub-matrices, each sub-matrix is derived from selecting half of the columns of an associated block matrix having 2M columns; and wherein the associated block matrix is derived from the Kronecker product of an associated entry in a Gold sequence of length S with an orthogonal or a non-orthogonal matrix T having 2M columns, in which $S<D$; and wherein the selection of half of the columns of the associated block matrix is based on the value of the associated entry in the Gold sequence used for Kronecker product with the orthogonal or the non-orthogonal matrix T, and the value is 1 or 0.

In an example, the non-orthogonal matrix T may be generated by omitting at least one row of an orthogonal matrix.

In an example, the length S of the Gold sequence multiplied by the number of rows in the orthogonal or the non-orthogonal matrix T may provide the matrix of dimension D×M.

In an example, each matrix of the pool may comprise a plurality of sub-matrices, each sub-matrix is derived from selecting half of the columns of an associated block matrix having 2M columns; and wherein the associated block matrix is derived from the Kronecker product of an associated entry in a Gold sequence of length S with a matrix T with co-phase and has 2M columns, in which S<D, and half of the 2M columns of the matrix T are equal to the remaining half of the 2M columns of the matrix T multiplied with a common phase factor; and wherein the selection of half of the columns of the associated block matrix is based on the value of the associated entry in the Gold sequence used for Kronecker product with the matrix T, and the value is 1 or 0.

In an example, the common phase factor may include −1.

In an example, the length S of the Gold sequence multiplied by the number of rows in the matrix T with co-phase may provide the matrix of dimension D×M.

In an example, transmitting the resource block across M transmit antennas may further comprise: mapping each entry of each vector to a resource element of the resource block which includes being configured with D resource elements; and transmitting each vector using a different transmit antenna of the M transmit antennas.

In an example, each matrix of the pool is derived, at least in part, by sub-sampling D rows of a larger matrix of dimension L×M, in which L>>D.

In an example, deriving each matrix of the pool may further comprise: multiplying a diagonal matrix of dimension D×D with a unitary matrix of dimension D×M to derive the associated matrix, wherein the multiplication is based on the equation: $C_l=\theta^{l-1}C_1$, in which $C_l$ is the associated matrix derived, θ is the diagonal matrix, l is an integer, and $C_1$ is the unitary matrix.

In an example, the diagonal matrix may include diagonal elements defined as $\{e^{i2\pi u_1/L}, e^{i2\pi u_2/L}, \ldots, e^{i2\pi u_t/L}, \ldots, e^{i2\pi u_D/L}\}$, in which $u_t$ is the t-th index of a set of integers, where each integer in the set of integers is selected from the range [0, L−1].

In an example, the larger matrix may include a discrete Fourier transform (DFT) matrix.

In an example, each of the M vectors may be a Gold sequence of length D.

In an example, M and D may respectively be defined to be 2 and 168.

In an example, the method may be performed at a user equipment (UE), wherein the set of I bits of information stream may comprise uplink control information (UCI), and the selection of the matrix from the pool of at least $2^I$ matrices to uniquely represent the set of I bits of information stream is based on the UCI.

In an example, the UCI may be included in a transport block of data and wherein the data is modulated directly to the resource block.

According to a 2nd aspect, there is disclosed a method of demodulation of a set of I bits of information stream, comprising: (i) receiving, at N receive antennas, a resource block of resource elements, wherein the resource block is transmitted from M transmit antennas; (ii) for each of the N receive antennas, performing a correlation of received bits of the resource block with respective sequences from respective M codebooks to provide respective correlations, and performing a summation of the respective correlations to obtain a correlation result; (iii) performing a summation of respective correlation results obtained for the N receive antennas to provide a correlated output; (iv) repeating steps (ii) to (iii) for each of I sequences from the respective M codebooks to obtain respective correlated outputs associated with respective I sequences; (v) selecting a correlated output, from the respective correlated outputs, with the maximum value to determine the corresponding i-th sequence that enables the selected correlated output; and (vi) mapping the determined i-th sequence to a corresponding set of I bits, according to a predetermined mapping.

In an example, the I sequences from the first codebook and the I sequences from the second codebook may represent first and second transmission vectors respectively of high auto-correlation and low cross-correlation.

In an example, the method may be performed at a base station, if the set of I bits of information stream comprise uplink control information (UCI).

According to a 3rd aspect, there is disclosed an apparatus for transmission of a set of I bits of information stream, comprising: a processor; a memory communicatively coupled to the processor; and executable instructions code stored in the memory, which when executed by the processor, cause the processor to: select, from a pool of at least $2^I$ matrices, a matrix to uniquely represent the set of I bits of information stream, wherein each matrix of the pool is a set of M vectors, and each vector is of length D; and transmit a resource block across M transmit antennas, wherein respective vectors of the M vectors are transmitted on respective transmit antennas of the M transmit antennas, and the transmitting comprises to map respective entries of the respective vectors to respective resource elements of the resource block.

According to a 4th aspect, there is disclosed an apparatus for demodulation of a set of I bits of information stream, comprising: a processor; a memory communicatively coupled to the processor; and executable instructions code stored in the memory, which when executed by the processor, cause the processor to: (i) receive, at N receive antennas, a resource block of resource elements, wherein the resource block is transmitted from M transmit antennas; (ii) for each of the N receive antennas, perform a correlation of received bits of the resource block with respective sequences from respective M codebooks to provide respective correlations, and perform a summation of the respective correlations to obtain a correlation result; (iii) perform a summation of respective correlation results obtained for the N receive antennas to provide a correlated output; (iv) repeat steps (ii) to (iii) for each of I sequences from the respective M codebooks to obtain respective correlated outputs associated with respective I sequences; (v) select a correlated output, from the respective correlated outputs, with the maximum value to determine the corresponding i-th sequence that enables the selected correlated output; and (vi) map the determined i-th sequence to a corresponding set of I bits, according to a predetermined mapping.

In an example, based on the 3rd aspect, the apparatus may be a user equipment (UE), or based on the 4th aspect, the apparatus may be a base station.

According to a 5th aspect, there is disclosed a method of transmission of a set of I bits of information stream, comprising: deriving a set of P matrices, each matrix in the set of P matrices comprises M vectors each of length d; chopping the I bits of information stream into respective segments each having J bits of information stream, and each segment is configured to be of equal length $\log_2(P)$, wherein $\log_2(P)=J$, and J<I; mapping, based on a value represented by the associated J bits of each segment, each segment to a matrix in the set of the P matrices; and transmitting, across M transmit antennas, the respective matrices mapped to the respective segments using at least a subset of assigned resources of a resource block to communicate the set of I bits of information stream.

In an example, the subset of assigned resources may comprise a plurality of orthogonal frequency-division multiplexing (OFDM) symbols of the resource block, and the respective matrices are transmitted using respective OFDM symbols of the plurality of OFDM symbols.

BRIEF DESCRIPTION OF THE DRAWINGS

In so that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
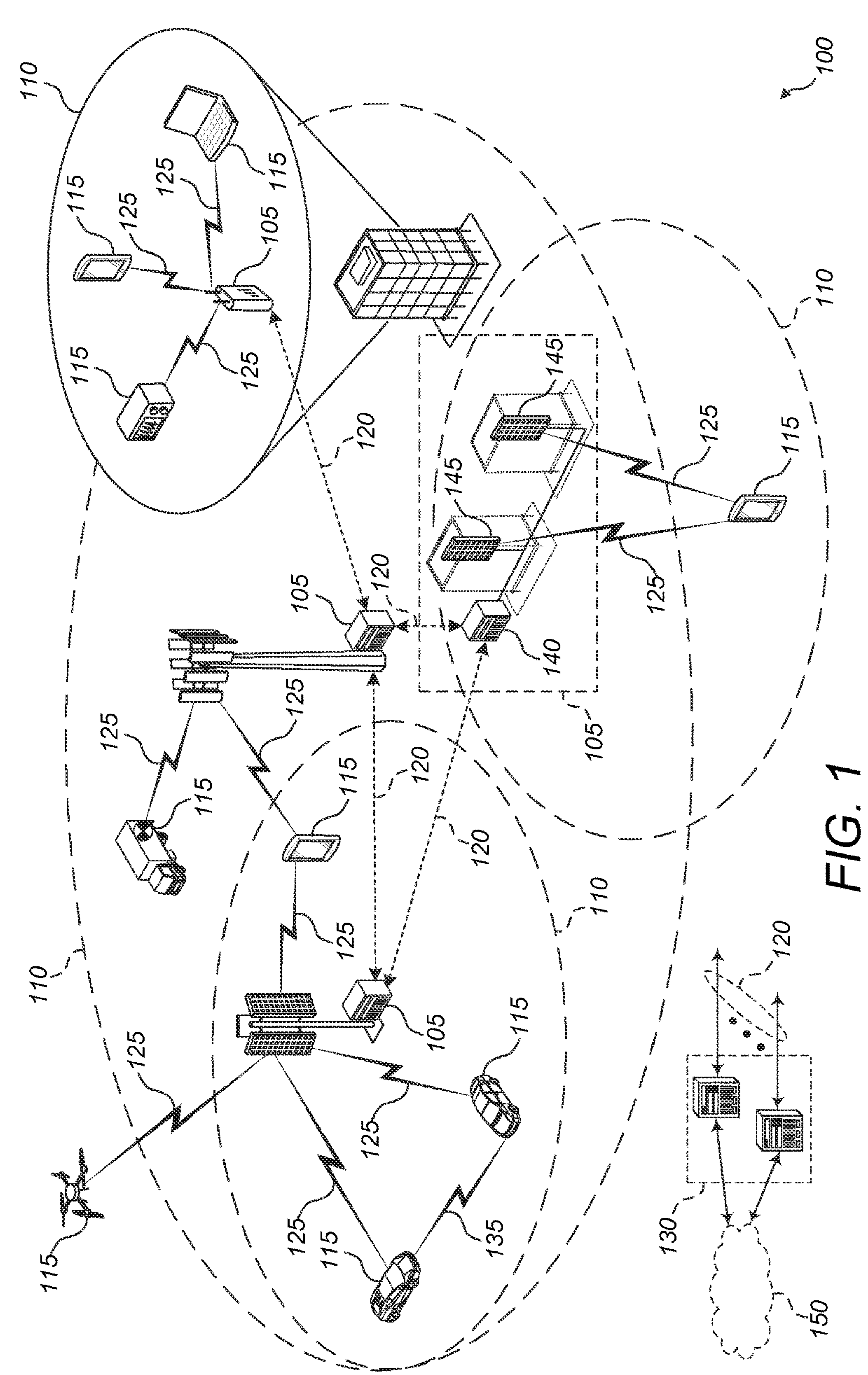
FIG. 1 is a block diagram conceptually illustrating an example telecommunications system, in which aspects of the present disclosure may be performed.

Aspects of the present disclosure provide non-coherent transmission diversity communication, directed particularly at a method of transmission of a set of I bits of information stream, comprising: selecting, from a pool of at least $2^I$ matrices, a matrix to uniquely represent the set of I bits of information stream, wherein each matrix of the pool is a set of M vectors, and each vector is of length D; and (ii). transmitting a resource block across M transmit antennas, wherein each of the M vectors is transmitted on one of the M transmit antennas, by mapping respective entries of a vector to respective resource elements of the resource block. For avoidance of doubt, each of I, M and D is defined to be greater than 1.

The following description provides examples of transmitting and/or receiving a set of I bits of information stream using, for example, multiple-input multiple-output (MIMO)- based communication systems, but are not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration". Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, and etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g. 5G NR) wireless technologies, aspects of the present disclosure can be applied in other generation-based communication systems and/or other types of radio-based wireless technologies (e.g. IEEE 802.11x protocol family).

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Some wireless communication systems may include communication devices, such as user equipments (UEs) and base stations, for example, next-generation NodeBs or giga-NodeBs (either of which may be referred to as a gNB) that may support multiple radio access technologies including fourth generation (4G) systems such as Long Term Evolution (LTE) systems and fifth generation (5G) systems which may be referred to as New Radio (NR) systems. In some cases, some wireless communications systems, such as 4G systems and 5G systems, may employ techniques such as transmit diversity, receive diversity, multiple-input multiple-output (MIMO) communications, or beamforming to support high reliability and high data throughput operations.

FIG. 1 illustrates an example of a wireless communications system 100 that supports non-coherent transmission diversity communications, in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g. mission critical) communications, low latency communications, communications with low-cost and low-complexity devices, or any combination thereof.

The base stations 105 may be dispersed throughout a geographic area to form the wireless communications system 100, and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some examples UEs 115 are illustrated in FIG. 1. The UEs 115 described herein may be able to communicate with various types of devices, such as other UEs 115, the base stations 105, or network equipment (e.g. core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g. via an S1, N2, N3, or other interface). The base stations 105 may communicate with one another over the backhaul links 120 (e.g. via an X2, Xn, or other interface) either directly (e.g. directly between base stations 105), or indirectly (e.g. via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (e.g. LTE, LTE-A, LTE-A Pro, NR). Each physical layer channel may carry acquisition signaling (e.g. synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g. in a carrier aggregation configuration), a carrier may also have acquisition signaling or control signaling that coordinates operations for other carriers. A carrier may be associated with a frequency channel (e.g. an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g. of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g. in an FDD mode) or may be configured to carry downlink and uplink communications (e.g. in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g. 1, 4, 3, 5, 10, 15, 20, 40, or 80 megahertz (MHz)). Devices of the wireless communications system 100 (e.g. the base stations 105, the UEs 115, or both) may have hardware configurations that support communications over a particular carrier bandwidth or may be configurable to support communications over one of a set of carrier bandwidths. In some examples, the wireless communications system 100 may include base stations 105, or UEs 115 that support simultaneous communications via carriers associated with multiple carrier bandwidths. In some examples, each served UE 115 may be configured for operating over portions (e.g. a sub-band, a BWP) or all of a carrier bandwidth.

Signal waveforms transmitted over a carrier may be made up of multiple subcarriers (e.g. using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (e.g. the duration of one modulation symbol) and one subcarrier, in some examples, the symbol duration and subcarrier spacing are inversely related. The number of bits carried by each resource element may depend on the modulation scheme (e.g. the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g. spatial layers or beams), and the use of multiple spatial layers may further increase the data rate or data integrity for communications with a UE 115.

One or more numerologies for a carrier may be supported, in some examples, a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling duration of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g. 10 milliseconds (ms)). Each radio frame may be identified by a system frame number (SFN) (e.g. ranging from 0 to 1023).

Each frame may include multiple consecutively numbered subframes or slots, and each subframe or slot may have the same duration. In some examples, a frame may be divided (e.g. in the time domain) into subframes, and each subframe may be further divided into a number of slots. Alternatively, each frame may include a variable number of slots, and the number of slots may depend on subcarrier spacing. Each slot may include a number of symbol durations (e.g. depending on the length of the cyclic prefix prepended to each symbol). In some wireless communications systems 100, a slot may further be divided into multiple mini-slots containing one or more symbols. Excluding the cyclic prefix, each symbol duration may contain one or more (e.g. $N_f$) sampling durations. The duration associated with a symbol duration may depend on the subcarrier spacing or frequency band of operation.

A subframe, a slot, a mini-slot, or a symbol may be the smallest scheduling unit (e.g. in the time domain) of the wireless communications system 100 and may be referred to as a transmission time interval (TTI). In some examples, the TTI duration (e.g. the number of symbol durations in a TTI) may be variable. Additionally or alternatively, the smallest scheduling unit of the wireless communications system 100 may be dynamically selected (e.g. in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g. a control resource set (CORESET)) for a physical control channel may be defined by a number of symbol durations and may extend across the system bandwidth or a subset of the system bandwidth of the carrier. One or more control regions (e.g. CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g. control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g. over a carrier) and may be associated with an identifier for distinguishing neighboring cells (e.g. a physical cell identifier (PCID), a virtual cell identifier (VCID), or others). In some examples, a cell may also refer to a geographic coverage area 110 or a portion of a geographic coverage area 110 (e.g. a sector) over which the logical communication entity operates. Such cells may range from smaller areas (e.g. a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g. several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g. licensed, unlicensed) frequency bands as macro cells. Small cells may provide unrestricted access to the UEs 115 with service subscriptions with the network provider or may provide restricted access to the UEs 115 having an association with the small cell (e.g. the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g. MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g. via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g. a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g. according to narrowband communications), or a combination of these techniques. For example, some UEs 115 may be configured for operation using a narrowband protocol type that is associated with a defined portion or range (e.g. set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g. mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g. using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g. UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g. base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g. a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g. radio heads and ANCs), or consolidated into a single network device (e.g. a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g. less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g. from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g. LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g. the same codeword) or different data streams (e.g. different codewords). Different spatial layers may be associated with different antenna ports used for channel measurement and reporting. MIMO techniques include single-user MIMO (SU-MIMO). In some examples, multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g. a base station 105, a UE 115) to shape or steer an antenna beam (e.g. a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g. with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g. antenna panels) to conduct beamforming operations for directional communications with a UE 115. Some signals (e.g. synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g. by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g. a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g. by a base station 105 or a UE 115) may be performed using multiple beam directions, and the device may use a combination of digital precoding or radio frequency beamforming to generate a combined beam for transmission (e.g. from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g. a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g. a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g. for identifying a beam direction for subsequent transmission or reception by the UE 115) or for transmitting a signal in a single direction (e.g. for transmitting data to a receiving device).

A receiving device (e.g. a UE 115) may try multiple receive configurations (e.g. directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g. different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g. when receiving a data signal). The single receive configuration may be aligned in a beam direction determined based on listening according to different receive configuration directions (e.g. a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g. using a cyclic redundancy check (CRC)), forward error correction (FEC), and retransmission (e.g. automatic repeat request (ARQ)). HARQ may improve throughput at the MAC layer in poor radio conditions (e.g. low signal-to-noise conditions). In some examples, a device may support same-slot HARQ feedback. The device may provide HARQ feedback in a specific slot for data received in a previous symbol in the slot. In other cases, the device may provide HARQ feedback in a subsequent slot, or according to some other time interval.

Figure 2:
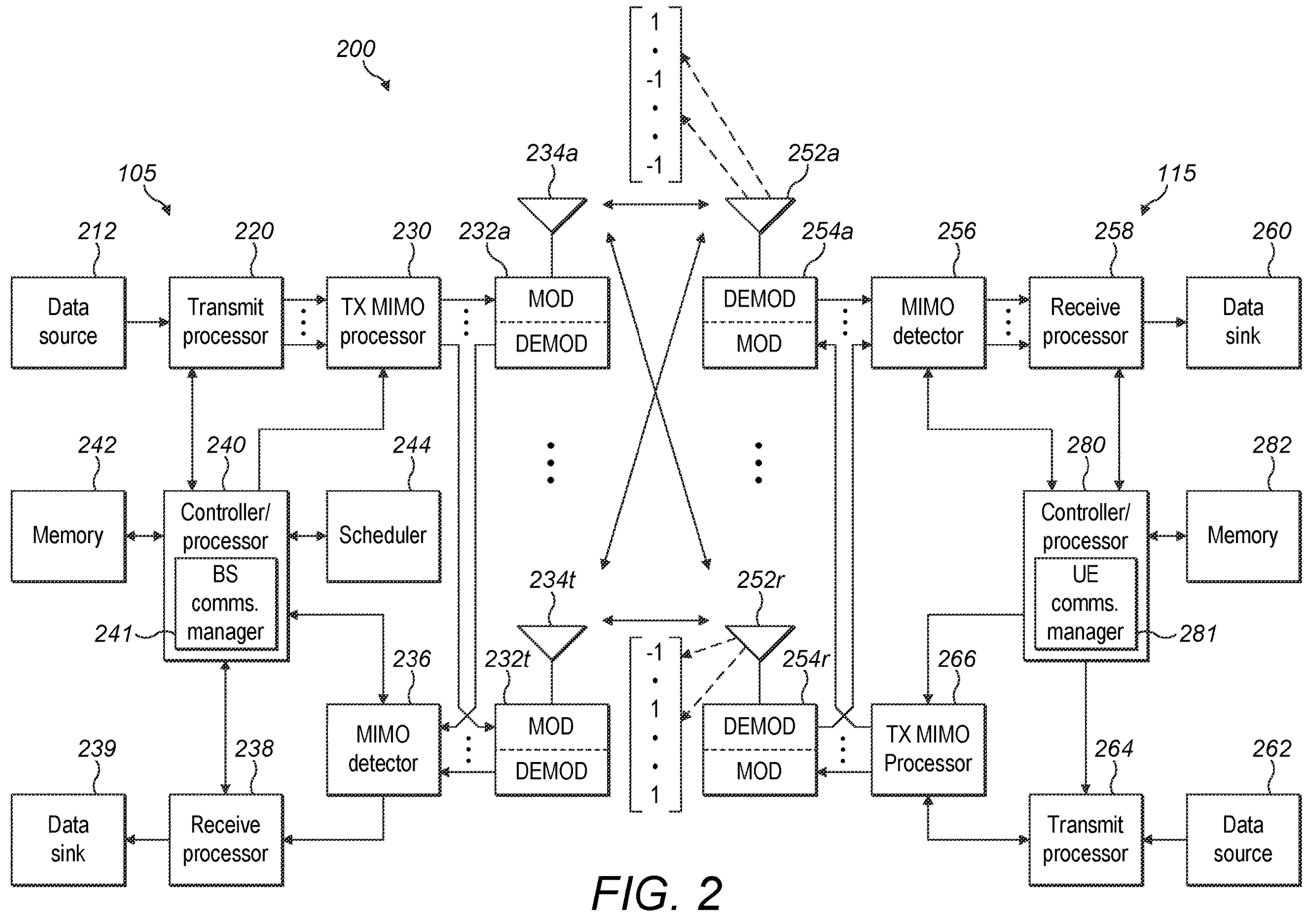
FIG. 2 is a block diagram conceptually illustrating a design of an example base station (BS) and a user equipment (UE), in accordance with aspects of the present disclosure.

FIG. 2 illustrates a block diagram 200 of example components of the base station 105 and the UE 115 (arranged in the wireless communications system 100 of FIG. 1), which may be used to implement aspects of the present disclosure.

At the base station 105, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and etc. The data may be for the physical downlink shared channel (PDSCH), and etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (e.g. encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g. precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g. for OFDM, etc.) to obtain an output sample stream. Each modulator may further process (e.g. convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At the UE 115, the antennas 252*a*-252*r* may receive the downlink signals from the base station 105, and may provide received signals to the demodulators (DEMODs) in transceivers 254*a*-254*r*, respectively. Each demodulator in transceivers 254*a*-254*r* may condition (e.g. filter, amplify, downconvert, and digitize) a respective received signal to obtain input samples. Each demodulator may further process the input samples (e.g. for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g. demodulate, deinterleave, and decode) the detected symbols, provide decoded data for the UE 120*a* to a data sink 260, and provide decoded control information to a controller/processor 280.

On the uplink, at UE 115, a transmit processor 264 may receive and process data (e.g. for the physical uplink shared channel (PUSCH)) from a data source 262 and control information (e.g. for the physical uplink control channel (PUCCH) from the controller/processor 280. The transmit processor 264 may also generate reference symbols for a reference signal (e.g. for the sounding reference signal (SRS)). The symbols from the transmit processor 264 may be precoded by a TX MIMO processor 266 if applicable, further processed by the modulators in transceivers 254*a*-254*r* (e.g. for SC-FDM, etc.), and transmitted to the base station 105. At the base station 105, the uplink signals from the UE 115 may be received by the antennas 234, processed by the demodulators in transceivers 232*a*-232*t*, detected by a MIMO detector 236 if applicable, and further processed by a receive processor 238 to obtain decoded data and control information sent by the UE 115. The receive processor 238 may provide the decoded data to a data sink 239 and the decoded control information to the controller/processor 240.

The memories 242 and 282 may store data and program codes for the base station 105, and the UE 115, respectively. A scheduler 244 may schedule UEs for data transmission on the downlink and/or uplink.

Antennas 252, processors 266, 258, 264, and/or controller/processor 280 of the UE 115, and/or antennas 234, processors 220, 230, 238, and/or controller/processor 240 of the base station 105 may be used to perform the various techniques and methods described herein. For example, as shown in FIG. 2, the controller/processor 240 of the base station 105 includes a base station communications manager 241 that may be configured to perform the operations illustrated in FIG. 15 or FIG. 25, as well as other operations described herein. Additionally, as shown in FIG. 2, the controller/processor 280 of the UE 115 includes a UE communications manager 281 that may be configured to perform the operations illustrated in FIG. 20, as well as other operations described herein. Although shown at the controller/processor, other components of the UE 115 and the base station 105 may also be configured to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, and etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
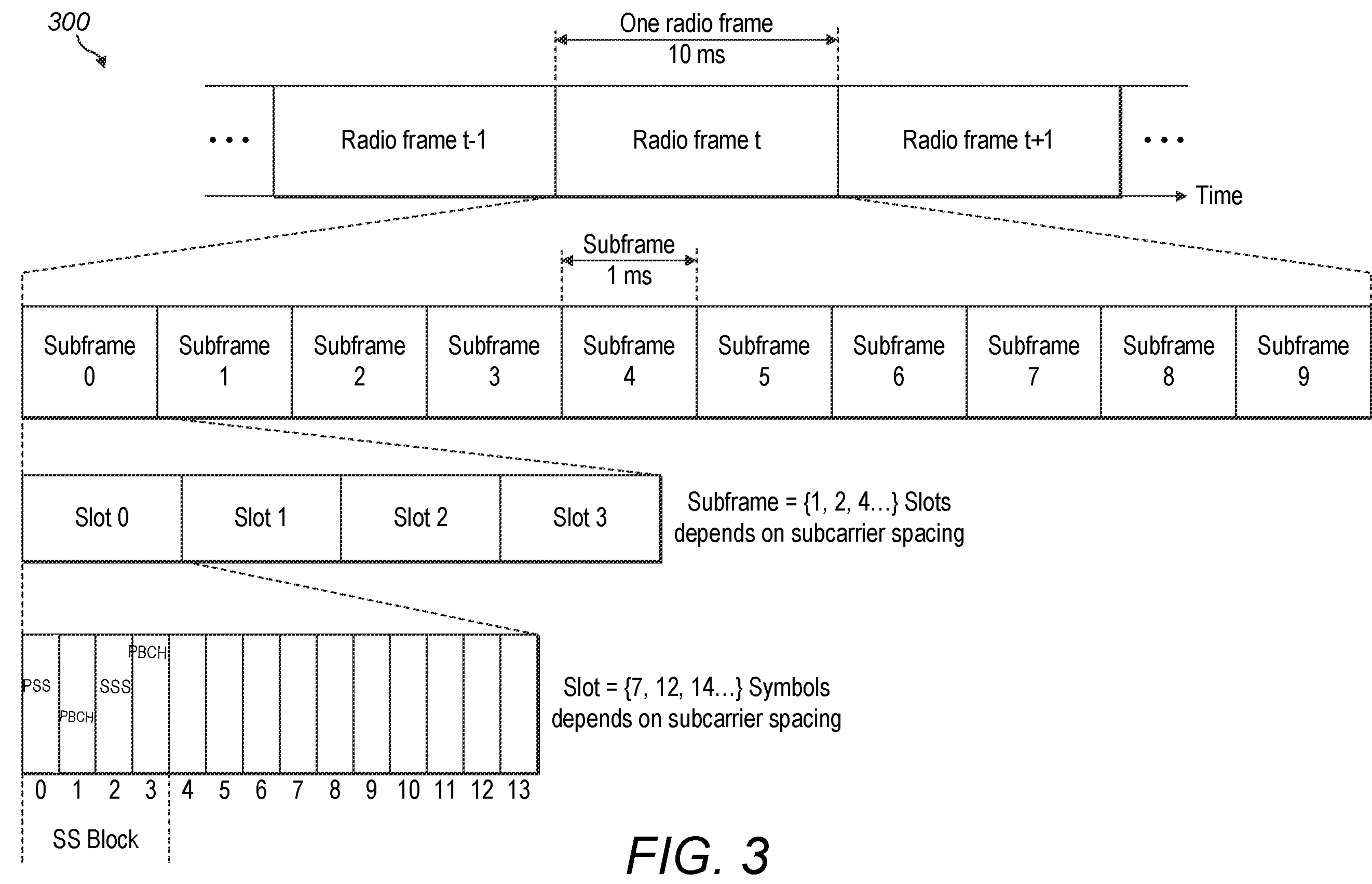
FIG. 3 illustrates an example of a frame format for a new radio (NR) system, in accordance with aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g. 10 ms) and may be partitioned into 10 subframes, each of 1 ms, with indices of 0 through 9. Each subframe may include a variable number of slots (e.g. 1, 2, 4, 8, 16, . . . slots) depending on the SCS. Each slot may include a variable number of symbol periods (e.g. 7, 12, or 14 symbols) depending on the SCS. The symbol periods in each slot may be assigned indices. A sub-slot structure may refer to a transmit time interval having a duration less than a slot (e.g. 2, 3, or 4 symbols). Each symbol in a slot may be configured for a link direction (e.g. DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g. including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, whereas the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
FIG. 4 shows a diagram illustrating an aspect associated with non-coherent transmission diversity communications, in accordance with aspects of the present disclosure.
Figure 4:
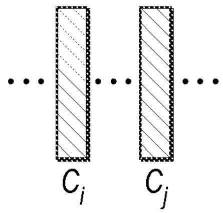

FIG. 4 shows a diagram 400 illustrating an aspect associated with non-coherent transmission diversity communications, in accordance with aspects of the present disclosure. Non-coherent transmission diversity communications may be performed by devices (e.g. the base station 105 or the UE 115) arranged with multiple antennas for MIMO communications.

According to an aspect, non-coherent transmission diversity communications is conceptually based on a system model for a channel (assumed with constant channel coherence time T, i.e. T channel uses), as expressed in equation (1):

$$Y=HX+W \tag{1}$$

X is a transmitted signal (as input) and may mathematically be represented as $X\in C^{M\times T}$ (i.e. of dimension M×T), Y is a received signal (as output) and may mathematically be represented as $Y\in C^{N\times T}$ (i.e. of dimension N×T), His the channel in concern, C is a unitary matrix (representing the information stream), M is the number of transmit antennas (Tx) (for communicating the transmitted signal), N is the number of receive antennas (Rx) (for receiving the transmitted signal), and W represents a random variable directed at additive noise. It is to be appreciated that M and N are greater than 1, i.e. M, N≥2.

Referring to equation (1), to identify a suitable unitary matrix C (for communicating the transmitted signal), a problem may be formulated as to find a pool (i.e. set) of matrices P of size $2^n$, where $P=\{C_i\in C^{T\times M}\}$ (i.e. each matrix $C_i$ is of dimension T×M), and any two matrices in the pool of matrices P is to be separated by a large minimum distance. That is, the pool of matrices P is to have maximum auto-correlation, and minimum cross-correlation.

Metrics for determining the minimum distance may be based on chordal/projection Forbenius norm, which enable minimization of the pairwise singular values of the matrix correlation $$C_i^H C_j.$$

Notwithstanding, other suitable metrics enabling maximization of the minimum distance between the matrices may be used too (e.g. maximize the KL divergence, and etc.). Further, it is to be appreciated that Gold sequences (i.e. Gold codes) may be adopted as vectors in each matrix $C_i$ to comply with the above criteria, although generally, any alternative codes that possess the property of good self-correlation may be used (e.g. Quadrature Phase Shift Keying (QPSK) sequences, Zadoff-Chua sequences, Walsh-Hadamard codes, M-sequences, Kasami-codes and etc.). Once the pool of matrices P is found, a suitable unitary matrix $C_i$ may be identified from within the pool of matrices P.

Figure 5:
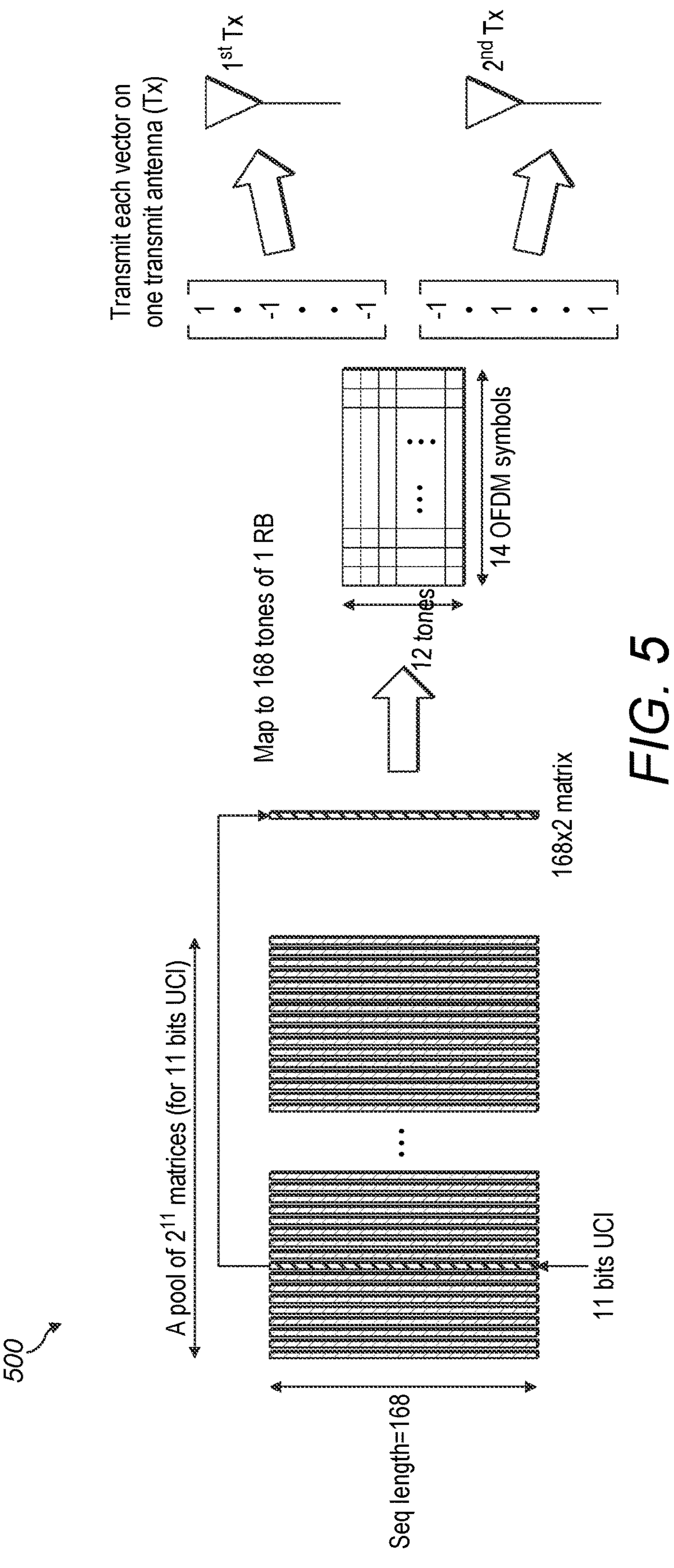
FIG. 5 is a diagram illustrating the conceptual overview for transmission of a set of I bits of information stream using non-coherent transmission diversity communications, in accordance with a first aspect of the present disclosure.

FIG. 5 is a diagram 500 illustrating the conceptual overview for transmission of a set of I bits of information stream using non-coherent transmission diversity communications, in accordance with a first aspect of the present disclosure. To facilitate understanding of the concept, the description below is set out with respect to a non-limiting example of transmitting uplink control information (UCI) of 11-bits (i.e. I=11), using two transmit antennas (i.e. M=2) configured for a UE 115. That is, the UE 115 is arranged with first and second transmit antennas in this example. Notwithstanding, it should be understood that the below discussed are equally applicable, mutatis mutandis, to the case of transmissions by a base station 105 instead, and also M is not limited to only the value of 2. With reference also to FIG. 4, a pool of matrices P of size $2^{11}$ (i.e. 2048) is first derived, and the respective vectors (e.g. Gold sequences) in the respective matrices have a sequence length D of 168 (i.e. D=168), if a resource block for transmitting the UCI includes 14 OFDM symbols, and 12 tones (i.e. making for a total of 168 resource elements in the resource block). The sequence length D of each of the vectors may correspond to the number $W_{RE}$ of resource elements in the resource block across all available OFDM symbols. The UCI may be included in a transport block of data and the said data may be modulated directly to the resource block. Then, based on the UCI, a suitable matrix C of dimension 168×2 may be selected. More specifically, the I-bits of the UCI (being a bit stream of information bits) are converted into a corresponding decimal number $X_I$, i.e. $X_I \leq 2^{I-1}$, and then, the $X_I$-th matrix from the pool of matrices is selected for transmission using the M transmit antennas.

Subsequently, respective entries of the respective vectors in the selected matrix C are mapped to respective resource elements of a resource block (e.g. comprises 14 OFDM symbols, and 12 tones for this example) to be used for transmitting the UCI. For instance, a first vector (of the selected matrix C) with sequence length D=168 has 168 entries. Each entry (of the 168 entries of the first vector) is mapped to a resource element of the resource block (with 168 resource elements), and then transmitted on the first transmit antenna. The second vector (of the selected matrix C) with sequence length D=168 also has 168 entries.

Similarly, each entry (of the 168 entries of the second vector) is mapped to a resource element of the same resource block (with 168 resource elements), and transmitted on the second transmit antenna. So, from the perspective of one resource element/one resource block, two different vectors are mapped to the same resource element/resource block, but that the two different vectors are transmitted separately via different transmit antennas. The resource block is to be transmitted across the two transmit antennas, in which respective vectors of the selected matrix C are transmitted on the respective two transmit antennas. Merely for illustration, the transmission of each vector on each transmit antenna of the UE 115 is also shown schematically in FIG. 2, i.e. transmitted on the antennas 252*a*, 252*r* of the UE 115—in this context, the UE 115 in FIG. 2 is interpreted to be arranged with only two transmit antennas 252*a*, 252*r*, in accordance with this example.

It is to be appreciated that the pool of matrices P may either: (1). be dynamically generated, only when the UE 115/base station 105 needs to perform transmissions, or (2). be pre-provided to the UE 115/base station 105, prior to the transmissions. In the first case, the UE 115/base station 105 may implement a sequence generator (not shown in the drawings) to facilitate generation of the respective vectors (e.g. the Gold sequences). For example, the sequence generator may generate the sequences one-by-one, i.e. if there are $2^I$ sequences to generate, the sequence generator may generate the $1^{st}$ sequence, followed by the $2^{nd}$ sequence, followed by the $3^{rd}$ sequence, and etc. Techniques to be further described below (with reference to FIGS. 6*a* to 9) for extending/transforming the generated sequences into respective matrices may then be used accordingly.

Alternatively, rather than generating the sequences in the typical conventional order, fast-forwarding sequence generation algorithms, configured to skip generation of the previous x−1 sequences, and to directly generate the x-th sequence (i.e. the x-th matrix from the pool of matrices P is to be transmitted, because the I-bits of the UCI convert into the decimal number x), may instead be utilized. In this manner, efficiency for generating the sequences/the pool of matrices P is improved using the fast forwarding sequence generation algorithms.

For the second case (i.e. the pool of matrices P are pre-provided), the pool of matrices P may be pre-determined, and stored as a "large" look-up-table locally at the UE 115/base station 105, or at an external third entity (being locally/remotely) accessible by the UE 115/base station 105. So, when a transmitter (of the UE 115/base station 105) needs to transmit the x-th matrix from the pool of matrices P (e.g. the I-bits of the UCI convert into the decimal number x), the transmitter simply selects the x-th matrix from the stored look-up-table and transmits the selected x-th matrix, which could provide further improved efficiency over the afore method of using the fast-forwarding sequence generation algorithms, because no "online" generation (i.e. on-the-fly generation) of the sequences/matrices is required in this case.

Envisaged use cases for non-coherent transmission diversity communications may include improving PUCCH/PDCCH coverage in low SNR environments, where channel estimation error could be large. For example, in the context of 5G NR, non-coherent transmission diversity communications may be used for Frequency-Range 3 (FR3) to mitigate the gap of coverage loss in FR3 relative to in Frequency-Range 1 (FR1), by utilizing the advantage that FR3 allows more transmissions. Another use case may be to provide a new type of PSS/SSS, where multi-port PSS/SSS with transmission diversity may be enabled. Non-coherent transmission diversity communications may also be used to implement lower power wakeup signal (WUS), as well as for communication in very high Doppler scenarios (e.g. in high speed trains), where DMRS pilot and/or channel state feedback (CSF) do not function well under those circumstances.

Accordingly, the described techniques may advantageously enable improvements to power consumption, spectral efficiency, higher data rates and, in some examples, may further promote enhanced efficiency for high reliability and low latency multicast operations in 5G systems, among other benefits.

The description below in respect of respective examples depicted in FIGS. 6*a* to 8, related to derivation of a pool of matrices P utilized for non-coherent transmission diversity communications (in accordance with the various aspects of the present disclosure), are set out with reference to the afore context of transmitting UCI of 11-bits (i.e. I=11), using a resource block with 168 resource elements (i.e. $W_{RE}$=168), via two transmit antennas (i.e. M=2) configured for a UE 115, but is however understood to be not limited as such. That is, the respective examples in in FIGS. 6*a* to 8 are equally applicable in the context of other possible values of I, M, P, and $W_{RE}$.

Figure 6A:
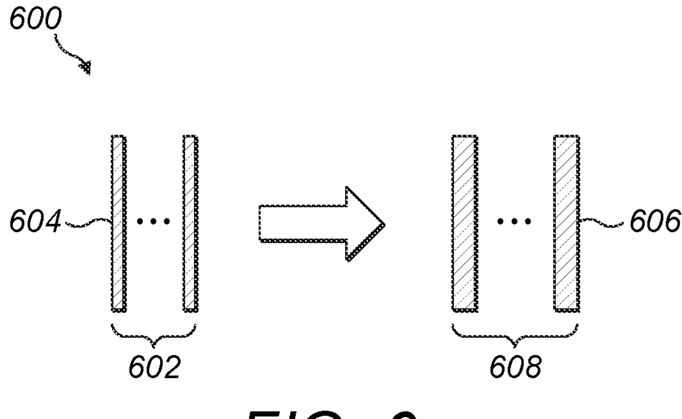
FIG. 6*a* is a diagram of a first example related to derivation of a pool of matrices utilized for non-coherent transmission diversity communications, in accordance with the first aspect of the present disclosure.

FIG. 6*a* is a diagram of a first example 600 related to deriving respective matrices for a pool of matrices P utilized for non-coherent transmission diversity communications, in accordance with the first aspect of the present disclosure (described with FIG. 5). Particularly, a pool 602 of a total of 1024 Gold sequences 604, each of length D (e.g. 168 with reference to the value of $W_{RE}$), are generated, based on the 11-bit length of the UCI. For this example 600, $D=W_{RE}$. Each Gold sequence 604 is then multiplied by a matrix Q of dimension L×R to "expand" said Gold sequence 604 into a corresponding matrix 606 of dimension D×M (e.g. 168×2). It may be considered that the expansion enables two respective Gold sequences 604 to be derived from the initial (seed) Gold sequence 604, in which the expansion may mathematically be expressed as equation (2):

$$C_i = S_i * Q \tag{2}$$

$C_i$ is a matrix derived from the expansion, $S_i$ is an associated (seed) Gold sequence used for the expansion, and Q is the matrix Q of dimension D×M. In this instance, Q may be defined as $$\begin{bmatrix} 1 & 1 \\ 1 & -1 \\ \vdots & \vdots \\ 1 & 1 \\ 1 & -1 \end{bmatrix}, \text{ or } \begin{bmatrix} 1 & 1 \\ 1 & -j \\ \vdots & \vdots \\ 1 & 1 \\ 1 & -j \end{bmatrix},$$

but is understood to be not limited specifically as such. The values of L and R in the dimension L×R of the matrix Q depend respectively on the length D of the Gold sequence 604, and the number M of transmit antennas. In this manner, based on the pool 602 of the 1024 Gold sequences 604, a total of 1024 unique matrices (each of dimension 168×2) may be derived as a pool 608 of matrices $P_A$, which consequently includes 2048 Gold sequences 604 (i.e. $2^{11}$).

Figure 6B:
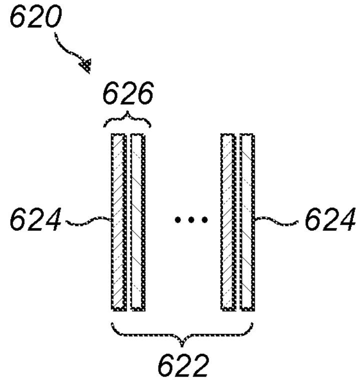
FIG. 6*b* is a diagram of a second example related to derivation of a pool of matrices utilized for non-coherent transmission diversity communications, in accordance with the first aspect of the present disclosure.

FIG. 6*b* is a diagram of a second example 620 related to derivation of a pool of matrices P utilized for non-coherent transmission diversity communications, in accordance with the first aspect of the present disclosure (described with FIG. 5). In this example 620, a pool 622 of Gold sequences 624, each of length D (e.g. 168 with reference to the value of $W_{RE}$), are generated. For this example 620, $D=W_{RE}$. Using the same context of transmitting UCI of 11-bits, the number of Gold sequences 624 generated for the pool 622 is $2^{11}$ (i.e. 2048). A matrix 626 for a pool 622 of matrices $P_B$ may then be derived by grouping (any) two (unique) Gold sequences 624 in the pool 622 to form said associated matrix 626. In other words, a total of 1024 unique matrices 626 (each of dimension 168×2) may be derived as the pool 622 of matrices $P_B$.

Figure 6C:
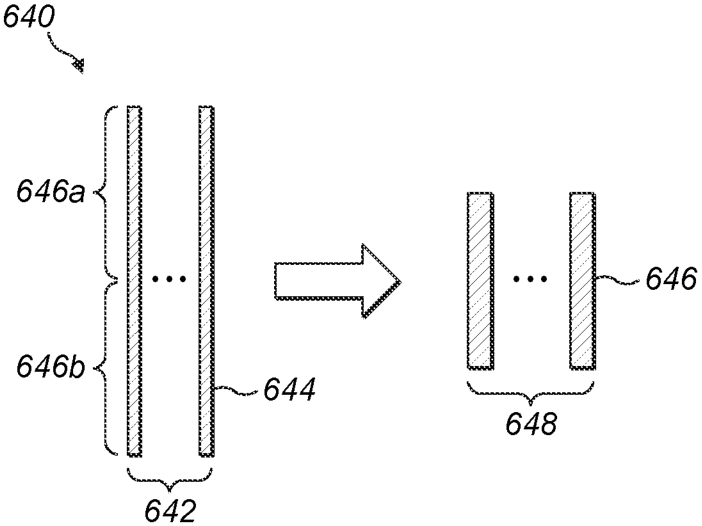
FIG. 6*c* is a diagram of a third example related to derivation of a pool of matrices utilized for non-coherent transmission diversity communications, in accordance with the first aspect of the present disclosure.

FIG. 6*c* is a diagram of a third example 640 related to derivation of a pool of matrices P utilized for non-coherent transmission diversity communications, in accordance with the first aspect of the present disclosure (described with FIG. 5). For this example 640, a pool 642 of a total of 1024 Gold sequences 644, each of length 2D (e.g. 336), are first generated, based on the 11-bit length of the UCI. In this example 640, $D=W_{RE}$. Thereafter, each Gold sequence 644 is divided into M (e.g. 2) parts, each of length D (e.g. 168 with reference to the value of $W_{RE}$), to obtain an associated matrix 646. For instance, in the context of transmission via two transmit antennas, a Gold sequence 644 is divided into a first half 646*a* (of the sequence) and a second half 646*b* (of the sequence). Accordingly, from the pool 642 of the 1024 Gold sequences 644, a total of 1024 unique matrices (each of dimension 168×2) may be derived as a pool 648 of matrices Pc, which is arranged with 2048 Gold sequences (i.e. $2^{11}$).

Figures 7A, 7B:
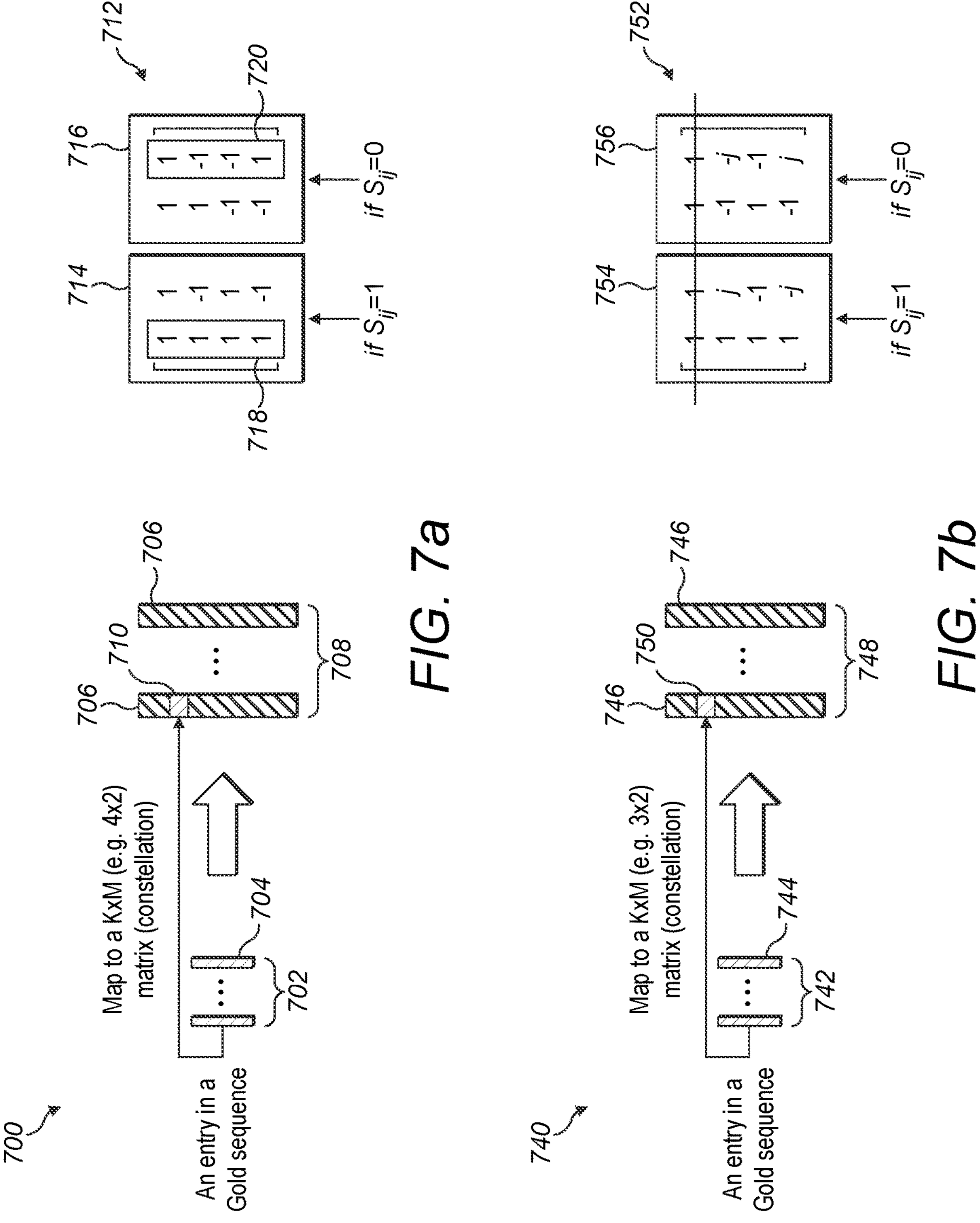
FIG. 7*a* is a diagram of a fourth example related to derivation of a pool of matrices utilized for non-coherent transmission diversity communications, in accordance with the first aspect of the present disclosure.
FIG. 7*b* is a diagram of a fifth example related to derivation of a pool of matrices utilized for non-coherent transmission diversity communications, in accordance with the first aspect of the present disclosure.

FIG. 7*a* is a diagram of a fourth example 700 related to derivation of a pool of matrices P utilized for non-coherent transmission diversity communications, in accordance with the first aspect of the present disclosure (described with FIG. 5). For this example 700, a pool 702 of a total of $2^{11}$ (i.e. 2048) Gold sequences 704 are first generated, based on the 11-bit length of the UCI. The length D of each generated Gold sequence 704 is arranged to be $W_{RE}/K$, where K is an integer greater than 1, i.e. $D<W_{RE}$, when K>1. For instance, K may have a value of 4, and so each Gold sequence 704 is of length 42 (i.e. D=42, where $W_{RE}$=168).

Each generated Gold sequence 704 is then scaled to derive an associated matrix 706 that becomes part of a pool 708 of matrices $P_D$ (i.e. a total of $2^{11}$ matrices in this case). Particularly, each associated matrix 706 comprises a plurality of sub-matrices 710, in which respective sub-matrices 710 are derived from respective entries of an associated Gold sequence 704 (i.e. a total of 42 sub-matrices in this instance, because each Gold sequence 704 is of length 42, meaning there are 42 entries in the Gold sequence 704 to be used for Kronecker product—refer to the discussions below) from the scaling. Each sub-matrix 710 is derived by selecting half of the columns of an associated block matrix of dimension K×2M (e.g. 4×4), and each sub-matrix 710 is of dimension K×M (e.g. 4×2). In other words, each entry of a Gold sequence 704 is mapped to a constellation point in a K×M dimension space. The associated block matrix (of dimension K×2M) is in turn derived from the Kronecker product of an associated entry in the associated Gold sequence 704 with an orthogonal matrix $T_A$ with 2M columns. So, the associated block matrix derived is also an orthogonal matrix.

Further, the selection of half of the columns of the associated block matrix (of dimension K×2M) is based on the value of the associated entry in the Gold sequence 704 (i.e. whether $S_{ij}$=1 or 0) used for Kronecker product with the orthogonal matrix $T_A$. Referring to FIG. 7*a*, an example block matrix 712 (of dimension 4×4) may be derived, and comprises first and second halves 714, 716 (each of dimension 4×2). If the value of the associated entry in a Gold sequence 704, used for Kronecker product with the orthogonal matrix $T_A$ to derive the block matrix 712, is of value 1 (i.e. $S_{ij}$=1), then the first half 714 is selected. On the other hand, if the value of the associated entry in a Gold sequence 704 is of value 0 instead (i.e. $S_{ij}$=0), then the second half 716 is selected.

The above is however not to be construed as limiting; in other alternative implementations, it may also be that the first half 714 is selected, if the value of the associated entry in a Gold sequence 704 is of value 0 (i.e. $S_{ij}$=0), whereas the second half 716 is selected, if the value of the associated entry in a Gold sequence 704 is of value 1 (i.e. $S_{ij}$=1).

Notwithstanding, it is also to be appreciated that in other aspects of the disclosure, the definition of a half of a block matrix may alternatively be based on grouping non-contiguous columns of the block matrix to form one half. For example in the case of the block matrix 712 (of FIG. 7*a*), the first column 718, and the last column 720 may instead form one half of the block matrix 712, i.e. the said two columns 718, 720 together form the first half of the block matrix 712, with the remaining columns then forming the second half of the block matrix 712. In a similar manner, other envisaged variations for defining different halves of a block matrix are possible.

FIG. 7*b* is a diagram of a fifth example 740 related to derivation of a pool of matrices P utilized for non-coherent transmission diversity communications, in accordance with the first aspect of the present disclosure (described with FIG. 5). For this example 740, a pool 742 of a total of $2^{11}$ (i.e. 2048) Gold sequences 744 are first generated, based on the 11-bit length of the UCI. The length D of each generated Gold sequence 744 is arranged to be $W_{RE}/K$, where K is an integer greater than 1, i.e. $D<W_{RE}$, when K>1. For illustration, K may have a value of 3, and so each Gold sequence 744 is of length 56 (i.e. D=56, where $W_{RE}$=168).

Thereafter, each generated Gold sequence 744 is scaled to derive an associated matrix 746 that becomes part of a pool 748 of matrices $P_E$ (i.e. a total of $2^{11}$ matrices in this case). Particularly, each associated matrix 746 comprises a plurality of sub-matrices 750, in which respective sub-matrices 750 are derived from respective entries of an associated Gold sequence 744 (i.e. a total of 56 sub-matrices in this instance, because each Gold sequence 744 is of length 56, meaning there are 56 entries in the Gold sequence 744 to be used for Kronecker product) from the scaling. Each sub-matrix 750 is derived by selecting half of the columns of an associated block matrix of dimension K×2M (e.g. 3×4), and each sub-matrix 750 is of dimension K×M (e.g. 3×2). Each entry of a Gold sequence 744 is thus mapped to a constellation point in a K×M dimension space. The associated block matrix (of dimension K×2M) is in turn derived from the Kronecker product of an associated entry in the associated Gold sequence 744 with a non-orthogonal matrix $T_B$ with 2M columns. So, the associated block matrix derived is also a non-orthogonal matrix. The non-orthogonal matrix $T_B$ may, for example, be generated by omitting at least one row of an orthogonal matrix.

Similarly, the selection of half of the columns of the associated block matrix (of dimension K×2M) is based on the value of the associated entry in the Gold sequence 744 (i.e. whether $S_{ij}$=1 or 0) used for Kronecker product with the non-orthogonal matrix $T_B$. Referring to FIG. 7*b*, an example block matrix 752 (of dimension 3×4) may be derived, and comprises first and second halves 754, 756 (each of dimension 3×2). If the value of the associated entry in a Gold sequence 744, used for Kronecker product with the non-orthogonal matrix $T_B$ to derive the block matrix 752, is of value 1 (i.e. $S_{ij}$=1), then the first half 754 is selected. On the other hand, if the value of the associated entry in a Gold sequence 744 is of value 0 instead (i.e. $S_{ij}$=0), then the second half 756 is selected.

The above is not to be construed as limiting; in other alternative implementations, it may also be that the first half 754 is selected, if the value of the associated entry in a Gold sequence 744 is of value 0 (i.e. $S_{ij}$=0), whereas the second half 756 is instead selected, if the value of the associated entry in a Gold sequence 744 is of value 1 (i.e. $S_{ij}$=1).

It is highlighted that the alternative grouping of non-contiguous columns of a block matrix to form one half, in respect of the definition of a half of the block matrix, as afore described with reference to FIG. 7*a* is similarly applicable to the fifth example 740 as well.

Figure 7C:
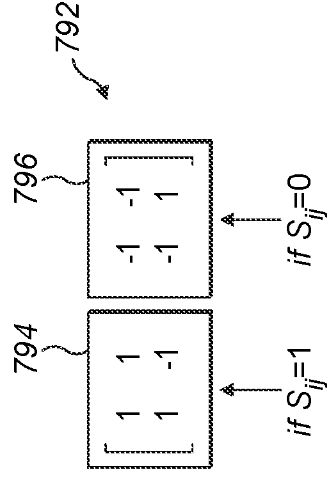
FIG. 7*c* is a diagram of a sixth example related to derivation of a pool of matrices utilized for non-coherent transmission diversity communications, in accordance with the first aspect of the present disclosure.
Figure 7C:
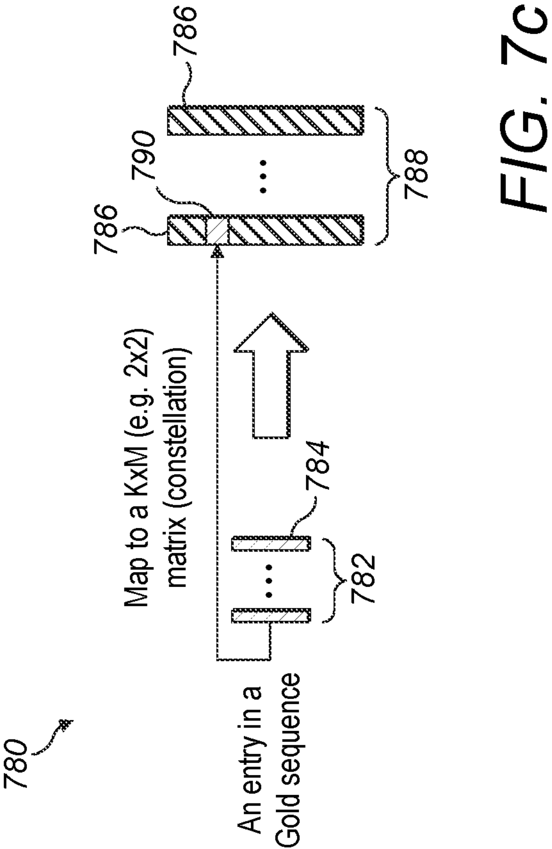

FIG. 7*c* is a diagram of a sixth example 780 related to derivation of a pool of matrices P utilized for non-coherent transmission diversity communications, in accordance with the first aspect of the present disclosure (described with FIG. 5). In this example 780, a pool 782 of a total of $2^{11}$ (i.e. 2048) Gold sequences 784 are first generated, based on the 11-bit length of the UCI. The length D of each generated Gold sequence 784 is arranged to be $W_{RE}$/K, where K is an integer greater than 1, i.e. D<$W_{RE}$, when K>1. For illustration, K may have a value of 2, and so each Gold sequence 784 is of length 84 (i.e. D=84, where $W_{RE}$=168).

Each generated Gold sequence 784 is scaled to derive an associated matrix 786 that becomes part of a pool 788 of matrices $P_F$ (i.e. a total of $2^{11}$ matrices in this case). Particularly, each associated matrix 784 comprises a plurality of sub-matrices 790, in which respective sub-matrices 790 are derived from respective entries of an associated Gold sequence 784 (i.e. a total of 84 sub-matrices in this instance, because each Gold sequence 784 is of length 84, meaning there are 84 entries in the Gold sequence 784 to be used for Kronecker product) from the scaling. Each sub-matrix 790 is derived by selecting half of the columns of an associated block matrix of dimension K×2M (e.g. 2×4), and each sub-matrix 790 is of dimension K×M (e.g. 2×2). That is, each entry of a Gold sequence 784 is mapped to a constellation point in a K×M dimension space. The associated block matrix (of dimension K×2M) is in turn derived from the Kronecker product of an associated entry in the associated Gold sequence 784 with a matrix $T_C$ with co-phase and with 2M columns. Specifically, one half of the 2M columns of the matrix $T_C$ is equal to the other half of the 2M columns multiplied by a common phase factor (e.g. −1). Hence, the associated block matrix also has co-phase property.

Further, the selection of half of the columns of the associated block matrix (of dimension K×2M) is based on the value of the associated entry in the Gold sequence 784 (i.e. whether $S_{ij}$=1 or 0) used for Kronecker product with the matrix $T_C$ with co-phase. Referring to FIG. 7*c*, an example block matrix 792 (of dimension 2×4) may be derived, and comprises first and second halves 794, 796 (each of dimension 2×2). If the value of the associated entry in a Gold sequence 784, used for Kronecker product with the matrix $T_C$ with co-phase to derive the block matrix 792, is of value 1 (i.e. $S_{ij}$=1), then the first half 794 is selected. If the value of the associated entry in a Gold sequence 784 is of value 0 instead (i.e. $S_{ij}$=0), the second half 796 is then selected.

Similarly, the above is not to be construed as limiting; in other alternative implementations, it may also be that the first half 794 is selected, if the value of the associated entry in a Gold sequence 784 is of value 0 (i.e. $S_{ij}$=0), whereas the second half 796 is instead selected, if the value of the associated entry in a Gold sequence 784 is of value 1 (i.e. $S_{ij}$=1).

Similarly, the alternative grouping of non-contiguous columns of a block matrix to form one half, in respect of the definition of a half of the block matrix, as afore described with reference to FIG. 7*a* is also herein applicable to the sixth example 780.

It is to be appreciated that the above described with reference to FIGS. 7*a*-7*c* is extendable similarly to instances where M>2, i.e. more than two transmit antennas. Take an example where M=4, an associated block matrix (of dimension K×2M) as derived now has 8 columns (i.e. 8 vectors). Each half of said block matrix comprises 4 columns (i.e. 4 vectors), and the selection of a specific half of the said block matrix is based similarly on the value of an associated entry in a Gold sequence 704, 744, 784 (i.e. whether $S_{ij}$=1 or 0) used for Kronecker product with the associated matrix $T_A$, $T_B$, $T_C$, as afore described. The other discussed alternative pertaining to the grouping of non-contiguous columns of a block matrix to form one half, in respect of the definition of a half of the block matrix, as above described with reference to FIGS. 7*a*-7*c*, is also applicable mutatis mutandis to instances where M>2.

Notwithstanding the above described with reference to FIGS. 7*a*-7*c*, it is also to be appreciated that the concept of selecting half of the columns of the associated block matrix (of dimension K×2M), based on the value of the associated entry in the Gold sequence 704, 744, 784 (i.e. whether $S_{ij}$=1 or 0) used for Kronecker product with the associated matrix $T_A$, $T_B$, $T_C$, may alternatively be generalised as based on M≥2, and also further be based on using more generic sequences (e.g. QPSK sequences, where each entry can be any of the following four values {1, −1, j, −j}), as opposed to using the Gold sequences. That is, the more generic sequences are used for Kronecker product with the associated matrix $T_A$, $T_B$, $T_C$.

For example, if QPSK sequences are used, with M=4 (i.e. four transmit antennas), the associated block matrix is instead to be derived with 4M columns/vectors (i.e. has a dimension K×4M). The associated block matrix is then partitioned into 4 (contiguous/non-contiguous) quarters, with each quarter arranged with 4 columns/vectors. The value of an entry of a QPSK sequence used for Kronecker product with the associated matrix $T_A$, $T_B$, $T_C$ determines which specific quarter (out of the 4 quarters) is selected. Accordingly, the 4 columns/vectors of the selected quarter are to be transmitted by the four transmit antennas, i.e. each transmit antenna is configured to transmit one column/vector.

Figure 8:
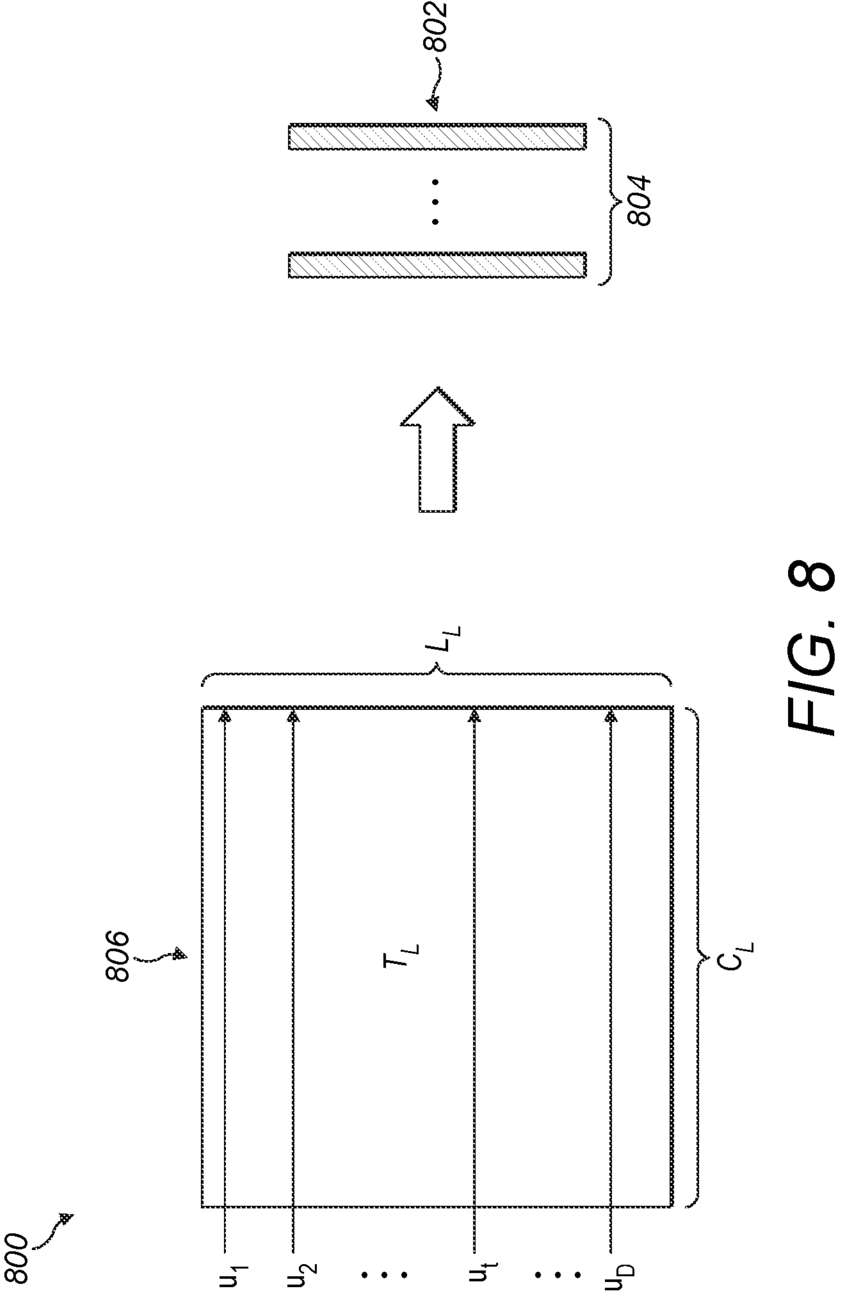
FIG. 8 is a diagram of a seventh example related to derivation of a pool of matrices utilized for non-coherent transmission diversity communications, in accordance with the first aspect of the present disclosure.

FIG. 8 is a diagram of a seventh example 800 related to derivation of a pool of matrices utilized for non-coherent transmission diversity communications, in accordance with the first aspect of the present disclosure (described with FIG. 5). For this example 800, each matrix 802 of a pool 804 of matrices $P_G$ is derived, at least in part, by sub-sampling rows of a larger matrix $T_L$ 806 of dimension $L_L \times C_L$, in which $L_L$ and $C_L$ are respectively defined to be $2^I$ and M (e.g. 2048×2). It is to be appreciated that $L_L >> D$ (e.g. 2048>>168). The number of rows to be sub-sampled (out of the $L_L$ rows of the matrix $T_L$ 806) is based directly on the value of D (e.g. 168), being an intended length of each vector (e.g. a Gold sequence) in a matrix 802.

Sub-sampling in this context refers to selecting a total of (any) D rows out of the $L_L$ rows. In effect, by sub-sampling the larger matrix $T_L$ 806, a resulting matrix 802 of dimension D×M may be obtained—indeed, the said resulting matrix 802 may be considered a "shrunk" version of the larger matrix $T_L$ 806 (i.e. the number of rows is reduced from $L_L$ to D). The sub-sampling is performed based on selected row indices of the $L_L$ rows of the matrix $T_L$ 806 to enable selection of the D rows with high autocorrelation and low cross correlation. In one example, selected row indices may be denoted as $\{u_1, u_2, u_3, u_4 \ldots u_{168}\}$, where D=168. A generalised form of the selected row indices may also be expressed as: $\{u_1, u_2, u_3, u_4 \ldots u_t \ldots u_D\}$, where t represents the t-th index in the selected row indices.

In an implementation, one way to set the specific D row indices for selecting the rows (of the larger matrix $T_L$ 806) may be performed using the Fibonacci sequence: {0, 1, 2, 3, 5, 8, 13, 21, 34, . . . }. Particularly, it may be that a good set of row indices (that can provide selected rows with high autocorrelation and low cross correlation from the larger matrix $T_L$ 806) is derived, based on the Fibonacci sequence for the case of a single transmit antenna, and therefore, the same row indices are re-used/extended for the case of the M transmit antennas.

For example, the denoted row indices $\{u_1, u_2, u_3, u_4 \ldots u_t \ldots u_D\}$ may be set according to the Fibonacci sequence, e.g. $\{u_1=0, u_2=1, u_3=2, u_4=3, u_5=5, u_6=8, u_7=13, u_8=21, u_9=34 \ldots\}$ (i.e. D rows with indices {0, 1, 2, 3, 5, 8, 13, 21, 34, . . . } are selected from the $L_L$ rows of the larger matrix $T_L$ 806). If a Fibonacci number to be assigned to a $u_t$ is greater than 2047, the said number may be wrapped around through modulo (i.e. a "mod" operation) of that number by $L_L$ (e.g. 2048). It is to be appreciated that sub-sampling based on Fibonacci sequence may generate small correlations that map each number to a row of a DFT matrix (of dimension 2048×2048) and enable calculation of the correlation between different rows.

An example of the larger matrix $T_L$ 806 is a discrete Fourier transform (DFT) matrix, but not limited as such; other suitable matrices may also be used. In particular, the derivation of each matrix 802 of the pool 804 may be based on equation (3):

$$C_l = \theta^{l-1} C_1 \tag{3}$$

$C_l$ is a matrix 802 derived, l is an integer, θ is a diagonal matrix of dimension D×D (e.g. 168×168, with reference to the value of $W_{RE}$), and $C_1$ is a unitary matrix of dimension D×M (e.g. 168×2). The diagonal elements of the diagonal matrix θ are defined as: $\{e^{i2\pi u_1/L}, e^{i2\pi u_2/L} \ldots, e^{i2\pi u_t/L}, \ldots, e^{i2\pi u_D/L}\}$, in which $u_t$ represents the 1-th index of a set of integers, and where each integer in the set of integers is selected from the range $[0, L_L-1]$.

Figure 9:
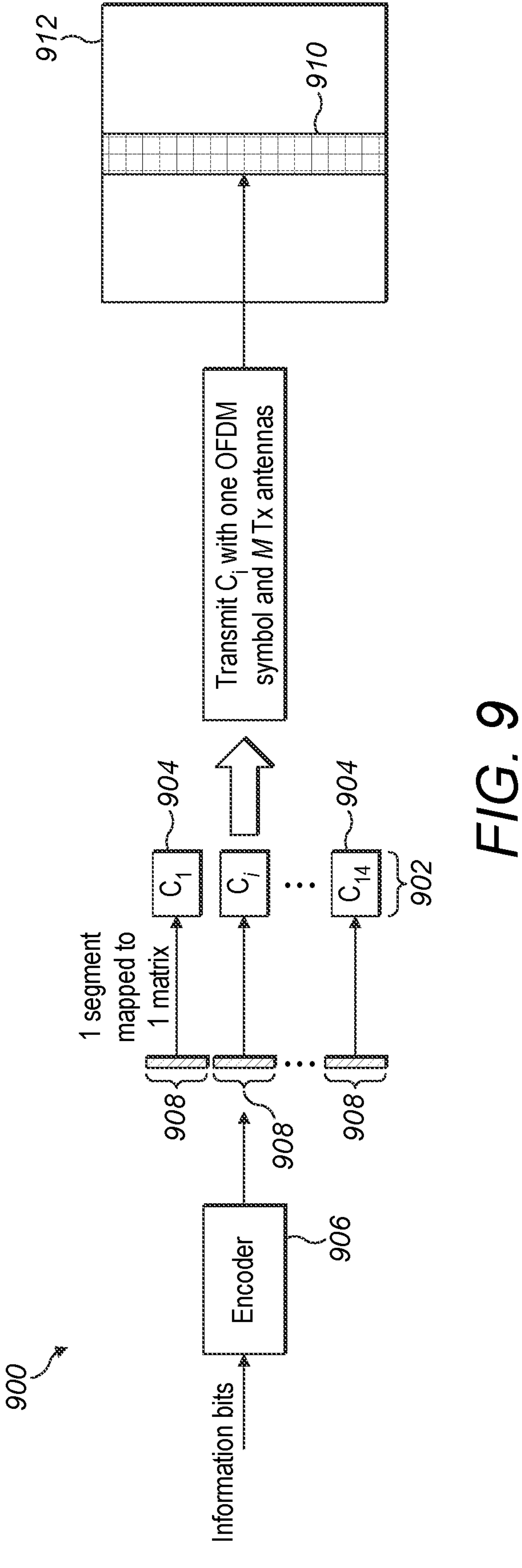
FIG. 9 is a diagram illustrating the conceptual overview for transmission of a set of I bits of information stream using non-coherent transmission diversity communications, in accordance with a second aspect of the present disclosure.

FIG. 9 is a diagram 900 illustrating the conceptual overview for transmission of a set of I bits of information stream using non-coherent transmission diversity communications, in accordance with a second aspect of the present disclosure. This aspect may be performed by the base station 105, or the UE 115 (if the information stream includes UCI). According to this aspect, for transmitting a set of I bits of information stream, a set 902 of smaller matrices $P_{sm}$ (of a total size $L_p$), is first derived (e.g. based on a computer search), and each smaller matrix ($C_i$) 904 in the set 902 of matrices $P_{sm}$ is arranged to be of dimension A×M (e.g. 12×2), where A<<1) (e.g. 12<<168). Hence, each smaller matrix ($C_i$) 904 is considered to comprise M vectors each of length A (i.e. for simplicity, A is denoted as "d" in the related appended claims directed at this second aspect).

The set of I bits of information stream may be encoded (e.g. using an encoder 906), with the encoded information stream then chopped/divided into respective segments 908, where each segment 908 may be configured to be of equal length $\log_2(L_p)$ bits-long (e.g. 4-bits in length, if $L_p=16$). Notwithstanding, this is not to be construed as limiting, because in other implementations, the I bits of information stream need not first be encoded (i.e. the encoding may be optional), before being dividing into the respective segments 908. In both cases, each segment 908 is arranged with J bits of information stream, where J is an integer (derived from $\log_2(L_p)$), and J<I. The relationship between the number of segments ($N_{seg}$) obtained from chopping the set of I bits of information stream, and the length of each segment of $\log_2(L_p)$ bits-long may be expressed as equation (4):

$$N_{seg} = I/\log_2(L_p) \tag{4}$$

Based on a value represented by the associated J bits of each segment, each segment 908 is then mapped to a matrix 904 in the set 902 of matrices $P_{sm}$. Subsequently, the respective matrices 904 mapped to the respective segments 908 are transmitted, across M transmit antennas, using at least a subset of assigned resources 910 of a resource block 912 to communicate the set of I bits of information stream. In some aspects, the subset of assigned resources 910 may comprise a plurality of OFDM symbols of the resource block 912 and the respective matrices 9904 are transmitted using respective OFDM symbols of the plurality of OFDM symbols.

The concept depicted in FIG. 9 for transmitting the set of I bits of information stream using non-coherent transmission diversity communications is herein illustrated with an example, which is understood to also be extendable to different values of I and $L_p$. According to 3GPP standards, one resource block may have 14 OFDM symbols. In this example, the total number of bits to be transmitted is 28-bits (i.e. I=28), and the total size $L_p$ of the set 902 of smaller matrices $P_{sm}$ is 4 (i.e. $L_p$=4). The length of each segment 908 is therefore 2-bits long (i.e. $\log_2(4)=2$, $L_p$=4). With each segment 908 of 2-bits length (i.e. J=2), the 28-bits of information stream are then chopped/divided into 14 corresponding, equal length, segments 908 (i.e. $N_{seg}$=14) of information stream.

Each segment 908 is mapped to one OFDM symbol for transmission, which implies 2-bits are to be transmitted via one OFDM symbol. The matrices $C_i$ 904 in the set of $P_{sm}$ matrices (of total size $L_p$=4) may be denoted as $\{M_A, M_B, M_C, M_D\}$. When a value represented by an associated 2-bits is "00", or "01", or "10", or "11", the matrices $M_A$, $M_B$, $M_C$, $M_D$ are respectively selected for the transmission of an associated segment 908 represented by said associated 2-bits value. For example, if a segment 908 is represented by a 2-bits value of "00", it is mapped to $M_A$ (for the transmission), or if the segment 908 is instead represented by a 2-bits value of "01", it is mapped to $M_B$, and so on and so forth. This concept applies to all the different respective segments 908 to be transmitted.

Notwithstanding, the above mapping scheme in relation to the matrices $M_A$, $M_B$, $M_C$, $M_D$ is not to be construed as limiting—other alterative mapping schemes are possible too (e.g. according to a different implementation, if a value represented by an associated 2-bits is "00", or "01", or "10", or "11", a different order of the matrices being: $M_C$, $M_A$, $M_D$, $M_B$ respectively may be used for the selection for transmitting the associated segment 908, depending on the 2-bits value).

As discussed, each smaller matrix $C_i$ 904 in the set 902 of matrices $P_{sm}$ is arranged to be of dimension A×M (e.g. 12×2), which implies each vector (e.g. 2 vectors in total) of a smaller matrix $C_i$ 904 is transmitted via 12 resource elements. In sum, a difference between the concept of FIG. 9 versus that as afore described for FIGS. 4-8 is that chopping of the set of I bits of information stream is performed under the former to "reduce" a design problem for a large matrix (e.g. of dimension 168×M) into a design problem for a much smaller matrix (e.g. of dimension 12×M) to facilitate non-coherent transmission diversity communications.

Figure 10:
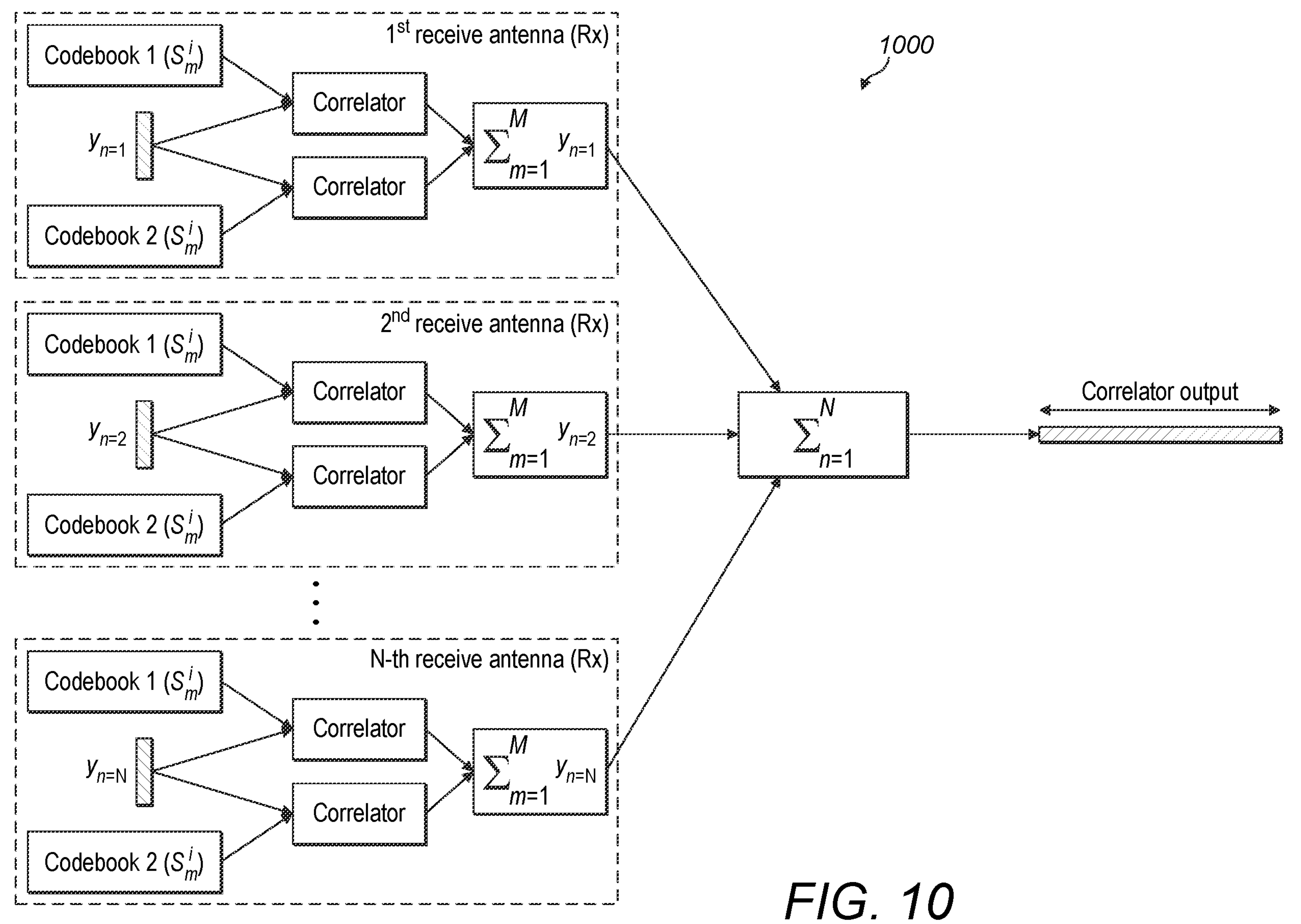
FIG. 10 is a block diagram of a receiver for demodulation of a set of I bits of information stream transmitted using non-coherent transmission diversity communications, in accordance with aspects of the present disclosure.

FIG. 10 is a block diagram of a receiver 1000 for demodulation of a set of I bits of information stream transmitted using the non-coherent transmission diversity communications, in accordance with aspects of the present disclosure. The receiver 1000 may be arranged in a base station 105 or a UE 115. Should the set of I bits of information stream comprise UCI, the receiver 1000 is arranged in the base station 105.

For the discussions herein, it is assumed that a channel, $h_{nm}$, through which the set of I bits of information stream are transmitted from M transmit antennas (i.e. m=1 . . . M, where m is the number of transmit antennas) to N receive antennas (i.e. n=1 . . . N, where n is the number of transmit antennas) is at least constant across one resource block. Further, a signal received on the n-th receive antenna may be expressed as equation (5):

$$y_n = \sum_{m=1}^{M} h_{nm}\hat{s}_m \tag{5}$$

$y_n$ is the received signal, $h_{nm}$ is the channel, and $\hat{s}_m$ is the sequence (e.g. length 168 for one resource block) transmitted by the m-th transmit antenna.

The receiver 1000 is specifically configured as a multi-codebook correlator receiver, with reference to equation (6):

$$\text{argmax}_i \sum_{n=1}^{N} \sum_{m=1}^{M} y_n^h s_m^i \tag{6}$$

$$s_m^i$$

is the i-th sequence of a codebook associated with the m-th transmit antenna. The receiver 1000 may be regarded as a maximum likelihood (ML) receiver, and is configured with an algorithm, explained below, for receiving the set of I bits of information stream transmitted by the M transmit antennas.

In a first operation (i), the algorithm instructs the receiver 1000 to receive, at the N receive antennas, a resource block of resource elements, in which the resource block is transmitted from the M transmit antennas. In a second operation (ii), for each of the N receive antennas, the algorithm instructs the receiver 1000 to perform a correlation of received bits of the resource block with a sequence from a first (sequence) codebook (associated with m=1) to provide a first correlation, with a sequence from a second (sequence) codebook (associated with m=2) to provide a second correlation, so on and so forth till the last codebook (associated with m=M) to obtain respective correlations. That is, there are M number of codebooks with which respective correlations of the received bits of the resource block are to be performed, and the number of codebooks available directly corresponds to the number of transmit antennas used to transmit the set of I bits of information stream. Subsequently, a summation of all the respective correlations obtained are summed to obtain a correlation result. The drawing in FIG. 10 shows only two codebooks, for the case of M=2 for simplicity of illustration, but is not to be construed as limiting, as based on the above explained.

In a third operation (iii), the algorithm instructs the receiver 1000 to perform a summation of respective correlation results obtained for the N receive antennas (based on operation (ii)) to provide a correlated output (e.g. with a size 2048 in length). In a fourth operation (iv), the algorithm instructs the receiver 1000 to repeat operations (ii) to (iii) for each of I sequences from the respective M codebooks to obtain respective correlated outputs associated with respective I sequences.

In a fifth operation (v), the algorithm instructs the receiver 1000 to then select a correlated output, from the respective correlated outputs, with the maximum value (i.e. maximum energy of correlation output) to allow determination of the corresponding i-th sequence that enables the selected correlated output. That is, in the context of equation (5), the i-th argument/sequence (among the I sequences) that provides the maximum value is selected.

In a sixth operation (vi), the algorithm instructs the receiver 1000 to map, according to a predetermined mapping, the determined i-th sequence to a corresponding set of I bits, in which the corresponding set of I bits being mapped to are then regarded as the set of I bits of information stream detected by the receiver 1000 (for the demodulation). That is, using the predetermined mapping, the determined i-th sequence is converted to the corresponding set of I bits. In some implementations, the I sequences from the first codebook and the I sequences from the second codebook represent first and second transmission vectors respectively of high auto-correlation and low cross-correlation.

Figure 11:
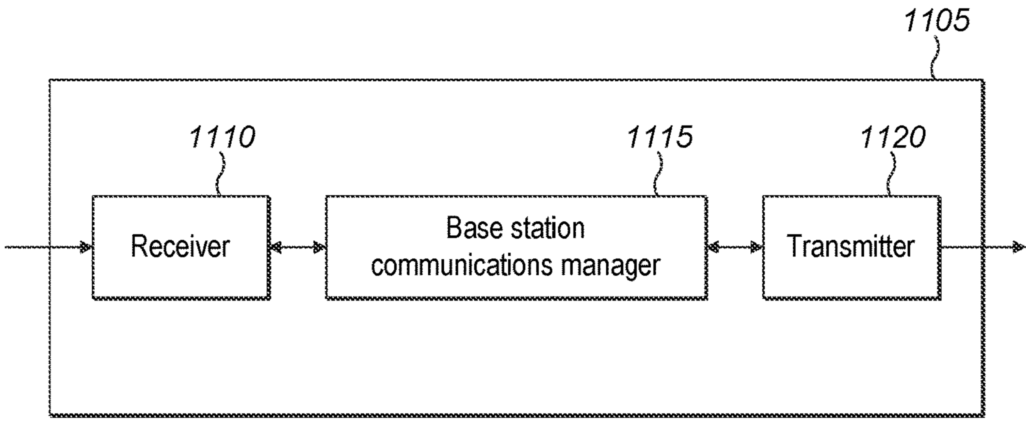
FIGS. 11 and 12 are block diagrams of devices that support non-coherent transmission diversity communications, in accordance with aspects of the present disclosure.

FIG. 11 is block diagram of a device 1105 that supports non-coherent transmission diversity communications, in accordance with aspects of the present disclosure. The device 1105 may be an example of aspects of a base station 105. The device 1105 may include a receiver 1110, a base station communications manager 1115, and a transmitter 1120. The base station communications manager 1115 can be implemented, at least in part, by one or both of a modem and a processor. Each of these components may be in communication with one another (e.g. via one or more buses).

The receiver 1110 may receive information such as packets, user data, or control information associated with various information channels (e.g. control channels, data channels, or information related to signals for non-coherent transmission diversity communications). Information may be passed on to other components of the device 1105. The receiver 1110 may be an example of aspects of the transceiver 1420 described with reference to FIG. 14. The receiver 1110 may utilize a single antenna or a set of antennas (e.g. for MIMO communications).

The base station communications manager 1115 may select, from a pool of at least $2^I$ matrices, a matrix to uniquely represent a set of I bits of information stream to be transmitted, wherein each matrix of the pool is a set of M vectors, and each vector is of length D; and may transmit a resource block across M transmit antennas, wherein respective vectors of the M vectors are transmitted on respective transmit antennas of the M transmit antennas, in which the transmitting comprises mapping respective entries of the respective vectors to respective resource elements of the resource block. The base station communications manager 1115 may be an example of aspects of the base station communications manager 1410 described herein with reference to FIG. 14.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas (e.g. for MIMO communications).

Figure 12:
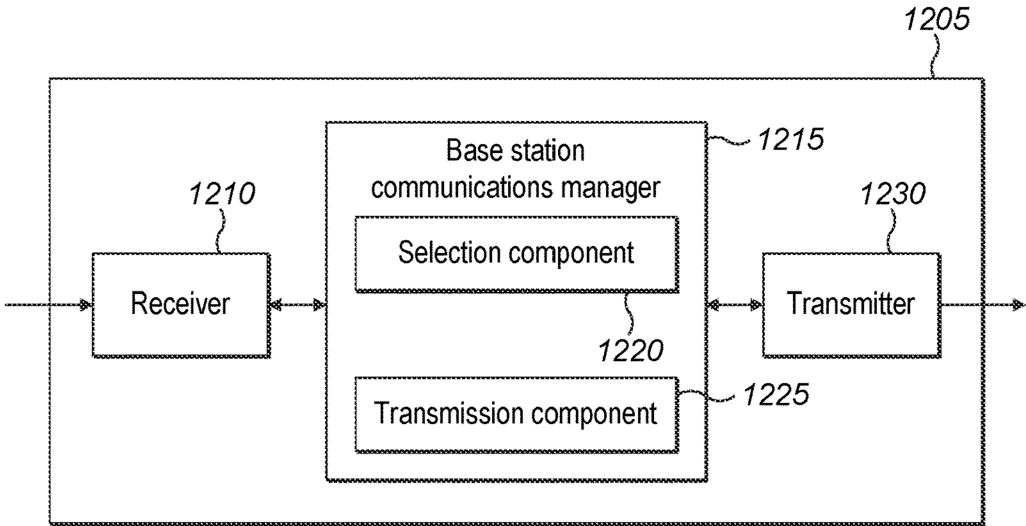

FIG. 12 is block diagram of a device 1205 that supports non-coherent transmission diversity communications, in accordance with aspects of the present disclosure. The device 1205 may be an example of aspects of a device 1105, or a base station 105. The device 1205 may include a receiver 1210, a base station communications manager 1215, and a transmitter 1230. The base station communications manager 1215 can be implemented, at least in part, by one or both of a modem and a processor. Each of these components may be in communication with one another (e.g. via one or more buses).

The receiver 1210 may receive information such as packets, user data, or control information associated with various information channels (e.g. control channels, data channels, or information related to signals for non-coherent transmission diversity communications). Information may be passed on to other components of the device 1205. The receiver 1210 may be an example of aspects of the transceiver 1420 described with reference to FIG. 14. The receiver 1210 may utilize a single antenna or a set of antennas (e.g. for MIMO communications).

The base station communications manager 1215 may include a selection component 1220 and a transmission component 1225.

The selection component 1220 may select, from a pool of at least $2^I$ matrices, a matrix to uniquely represent a set of I bits of information stream to be transmitted, wherein each matrix of the pool is a set of M vectors, and each vector is of length D. The transmission component 1225 may transmit a resource block across M transmit antennas, wherein respective vectors of the M vectors are transmitted on respective transmit antennas of the M transmit antennas, in which the transmitting comprises mapping respective entries of the respective vectors to respective resource elements of the resource block.

The transmitter 1230 may transmit signals generated by other components of the device 1205. In some examples, the transmitter 1230 may be collocated with the receiver 1210 in a transceiver component. For example, the transmitter 1230 may be an example of aspects of the transceiver 1420 described with reference to FIG. 14. The transmitter 1230 may utilize a single antenna or a set of antennas (e.g. for MIMO communications).

Figure 13:
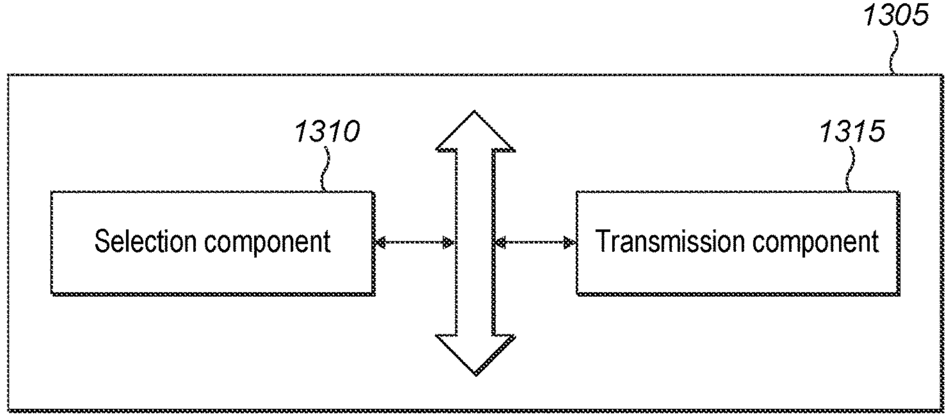
FIG. 13 is a block diagram of a communications manager that supports non-coherent transmission diversity communications, in accordance with aspects of the present disclosure.

FIG. 13 is a block diagram of a communications manager 1305 that supports non-coherent transmission diversity communications, in accordance with aspects of the present disclosure. The communications manager 1305 may be an example of aspects of a base station communications manager 1115, a base station communications manager 1215, or a base station communications manager 1410 described herein. The communications manager 1305 may include a selection component 1310, and a transmission component 1315. Each of these components may communicate, directly or indirectly, with one another (e.g. via one or more buses).

The selection component 1310 may select, from a pool of at least $2^I$ matrices, a matrix to uniquely represent a set of I bits of information stream to be transmitted, wherein each matrix of the pool is a set of M vectors, and each vector is of length D.

The transmission component 1315 may transmit a resource block across M transmit antennas, wherein respective vectors of the M vectors are transmitted on respective transmit antennas of the M transmit antennas, in which the transmitting comprises mapping respective entries of the respective vectors to respective resource elements of the resource block.

Figure 14:
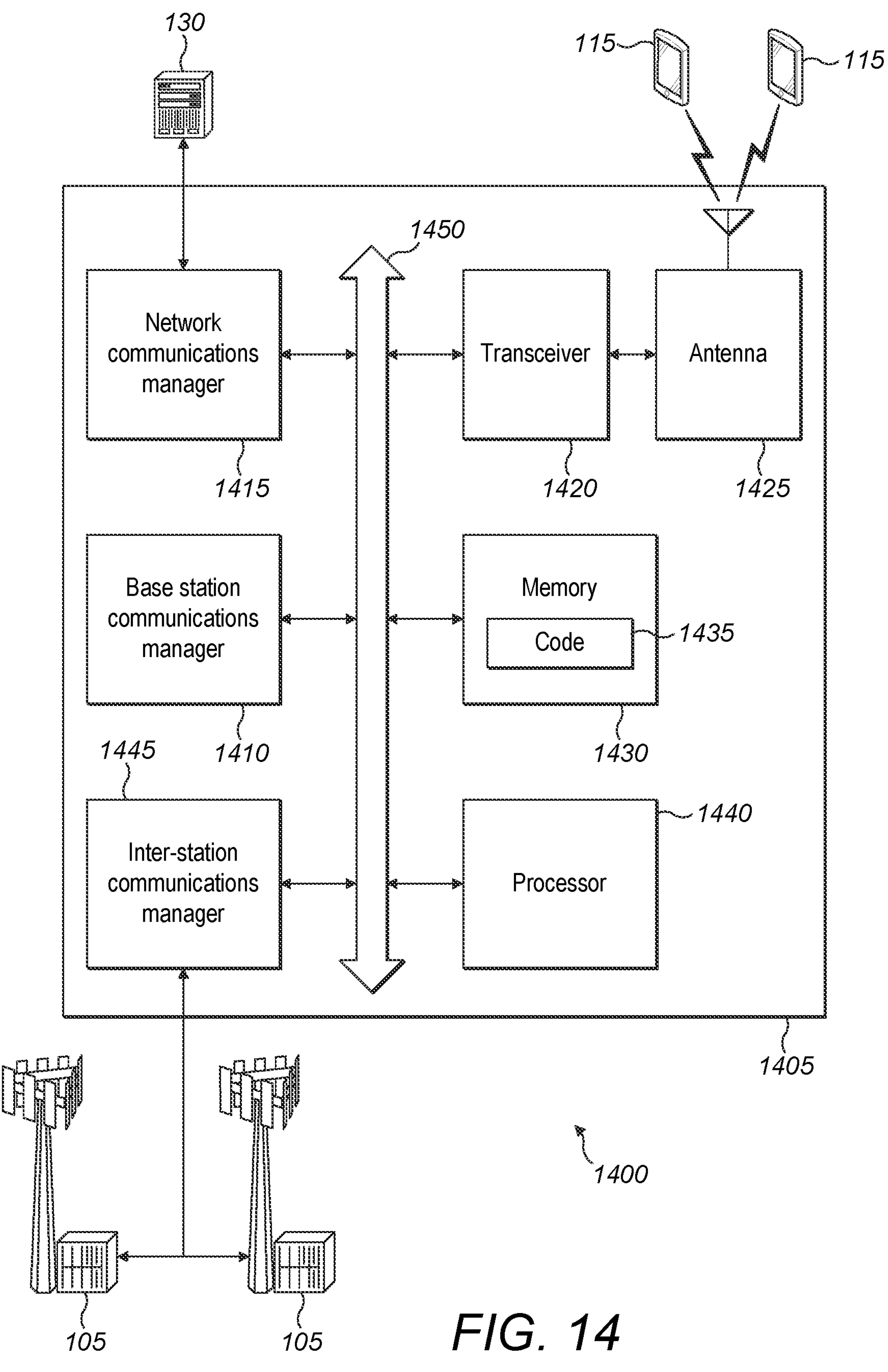
FIG. 14 is a diagram of a system including a device that supports non-coherent transmission diversity communications, in accordance with aspects of the present disclosure.

FIG. 14 is a diagram of a system 1400 including a device 1405 that supports non-coherent transmission diversity communications, in accordance with aspects of the present disclosure. The device 1405 may be an example of, or include the components of device 1105, device 1205, or a base station 105. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g. bus 1450).

The base station communications manager 1410 may select, from a pool of at least $2^I$ matrices, a matrix to uniquely represent a set of I bits of information stream to be transmitted, wherein each matrix of the pool is a set of M vectors, and each vector is of length D; and may transmit a resource block across M transmit antennas, wherein respective vectors of the M vectors are transmitted on respective transmit antennas of the M transmit antennas, in which the transmitting comprises mapping respective entries of the respective vectors to respective resource elements of the resource block.

The network communications manager 1415 may manage communications with the core network (e.g. via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some implementations, the device 1405 may include a single antenna 1425. However, in some implementations the device 1405 may have more than one antenna 1425, which may be capable of concurrently transmitting or receiving multiple wireless transmissions (e.g. for MIMO communications).

The memory 1430 may include RAM, ROM, or a combination thereof. The memory 1430 may store computer-readable code 1435 including instructions that, when executed by a processor (e.g. the processor 1440) cause the device to perform various functions described herein. In some implementations, the memory 1430 may contain, among other things, a BIOS which may control basic hardware or software operation such as the interaction with peripheral components or devices.

The processor 1440 may include an intelligent hardware device, (e.g. a general-purpose processor, a DSP, a CPU, a microcontroller, an ASIC, an FPGA, a programmable logic device, a discrete gate or transistor logic component, a discrete hardware component, or any combination thereof). In some implementations, the processor 1440 may be configured to operate a memory array using a memory controller. In some implementations, a memory controller may be integrated into processor 1440. The processor 1440 may be configured to execute computer-readable instructions stored in a memory (e.g. the memory 1430) to cause the device 1405 to perform various functions (e.g. functions or tasks supporting non-coherent transmission diversity communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The computer-readable code 1435 may include instructions to implement aspects of the present disclosure, including instructions to support non-coherent transmission diversity communications. The computer-readable code 1435 may be stored in a non-transitory computer-readable medium such as system memory or other type of memory.

In some implementations, the computer-readable code 1435 may not be directly executable by the processor 1440 but may cause a computer (e.g. when compiled and executed) to perform functions described herein.

Figure 15:
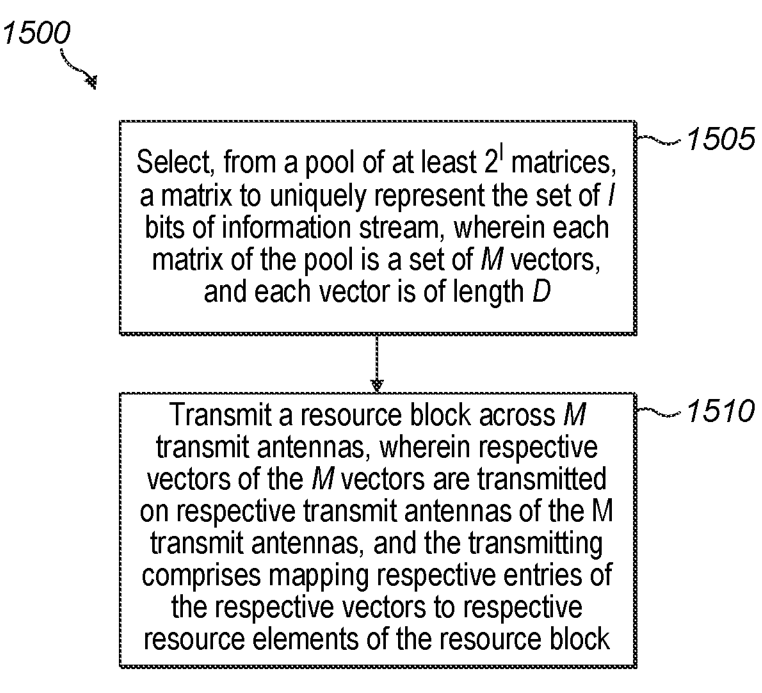
FIG. 15 is a flowchart illustrating a method that support transmission of a set of I bits of information stream using non-coherent transmission diversity communications, in accordance with aspects of the present disclosure.

FIG. 15 is a flowchart illustrating a method 1500 that support transmission of a set of I bits of information stream using non-coherent transmission diversity communications, in accordance with aspects of the present disclosure. The operations of method 1500 may be implemented by a base station 105 or its components. For example, the operations of method 1500 may be performed by a base station communications manager as described with reference to FIGS. 11-14. In some examples, a base station 105 may execute a set of instructions to control the functional elements of the base station 105 to perform the functions described below. Additionally or alternatively, a base station 105 may perform aspects of the functions described below using special-purpose hardware.

At 1505, the base station 105 may select, from a pool of at least $2^I$ matrices, a matrix to uniquely represent a set of I bits of information stream to be transmitted, wherein each matrix of the pool is a set of M vectors, and each vector is of length D. The operations of 1505 may be performed according to the methods described herein. In some examples, aspects of the operations of 1505 may be performed by a selection component as described with reference to FIGS. 11-14.

At 1510, the base station 105 may transmit a resource block across M transmit antennas, wherein respective vectors of the M vectors are transmitted on respective transmit antennas of the M transmit antennas, in which the transmitting comprises mapping respective entries of the respective vectors to respective resource elements of the resource block. The operations of 1510 may be performed according to the methods described herein. In some examples, aspects of the operations of 1510 may be performed by a transmission component as described with reference to FIGS. 11-14.

In some implementations, the operations of the method 1500 may be programmed into, and stored as corresponding computer-readable code 1435.

It is to be appreciated that if the set of I bits of information stream comprise UCI, the afore described with reference to FIGS. 11-15 are then to be understood, mutatis mutandis, in the context of equivalent respective aspects or components of a UE 115 (rather than the base station 105). Also, in such a scenario, the selection of the matrix from the pool of at least $2^I$ matrices to uniquely represent the set of I bits of information stream is based on the UCI.

Figure 16:
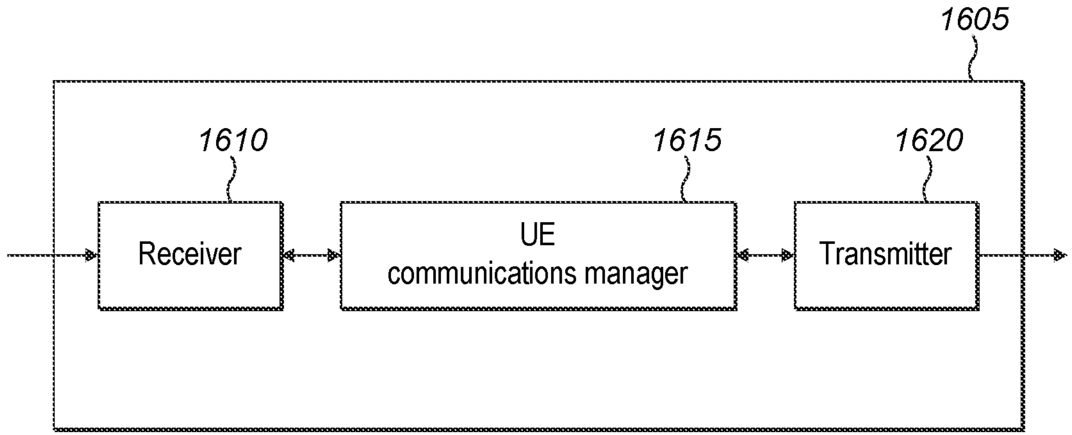
FIGS. 16 and 17 are block diagrams of devices that support non-coherent transmission diversity communications, in accordance with aspects of the present disclosure.

FIG. 16 is a block diagram of a device 1605 that supports non-coherent transmission diversity communications, in accordance with aspects of the present disclosure. The device 1605 may be an example of aspects of a UE 115, but is understood to not be limited as such. For example, the device 1605 may also be implemented as aspects of a base station 105, and the discussions below are then applicable, mutatis mutandis, in the context of the equivalent respective components arranged at the base station 105. The device 1605 may include a receiver 1610, a UE communications manager 1615, and a transmitter 1620. The UE communications manager 1615 can be implemented, at least in part, by one or both of a modem and a processor. Each of these components may be in communication with one another (e.g. via one or more buses).

The receiver 1610 may receive information such as packets, user data, or control information associated with various information channels (e.g. control channels, data channels, and information related to signals for non-coherent transmission diversity communications). Information may be passed on to other components of the device 1605. The receiver 1610 may be an example of aspects of the transceiver 1920 described with reference to FIG. 19. The receiver 1610 may utilize a single antenna or a set of antennas (e.g. for MIMO communications).

The UE communications manager 1615 may be configured to perform the following operations: (i) receiving, at N receive antennas, a resource block of resource elements, wherein the resource block is transmitted from M transmit antennas (i.e. N and M are greater than 1); (ii) for each of the N receive antennas, performing a correlation of received bits of the resource block with respective sequences from respective M codebooks to provide respective correlations, and performing a summation of the respective correlations to obtain a correlation result; (iii) performing a summation of respective correlation results obtained for the N receive antennas to provide a correlated output; (iv) repeating operations (ii) to (iii) for each of I sequences from the respective M codebooks to obtain respective correlated outputs associated with respective I sequences; (v) selecting a correlated output, from the respective correlated outputs, with the maximum value to determine the corresponding i-th sequence that enables the selected correlated output; and (vi) mapping the determined i-th sequence to a corresponding set of I bits, according to a predetermined mapping. The corresponding set of I bits (being mapped to) are then regarded as the set of I bits of information stream detected for the demodulation. The UE communications manager 1615 may be an example of aspects of the UE communications manager 1910 described herein with reference to FIG. 19.

The transmitter 1620 may transmit signals generated by other components of the device 1605. In some examples, the transmitter 1620 may be collocated with a receiver 1610 in a transceiver component. For example, the transmitter 1620 may be an example of aspects of the transceiver 1920 described with reference to FIG. 19. The transmitter 1620 may utilize a single antenna or a set of antennas (e.g. for MIMO communications).

Figure 17:
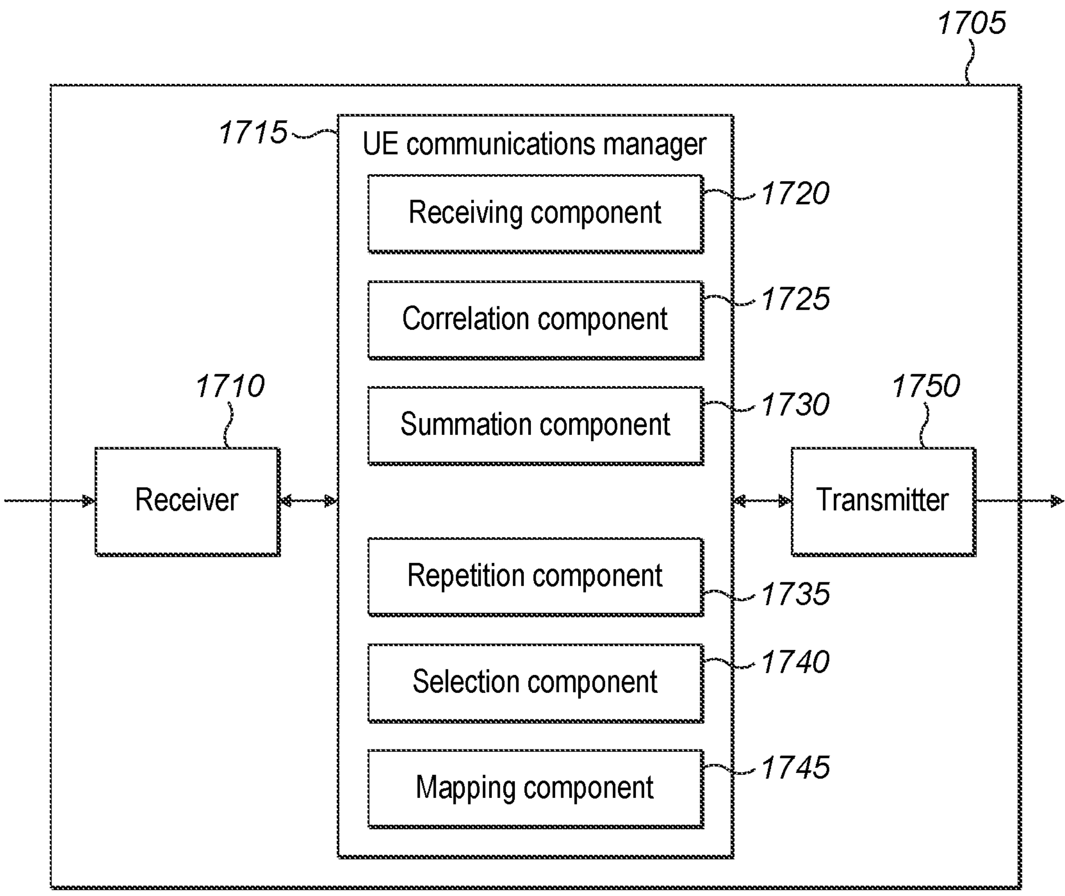

FIG. 17 is a block diagram of a device 1705 that supports non-coherent transmission diversity communications, in accordance with aspects of the present disclosure. The device 1705 may be an example of aspects of a device 1605, or a UE. It is also to be appreciated that the device 1705 may alternatively be implemented as aspects of a base station 105, and the discussions below are then applicable, mutatis mutandis, in the context of equivalent respective components arranged at the base station 105. The device 1705 may include a receiver 1710, a UE communications manager 1715, and a transmitter 1750. The UE communications manager 1715 can be implemented, at least in part, by one or both of a modem and a processor. Each of these components may be in communication with one another (e.g. via one or more buses).

The receiver 1710 may receive information such as packets, user data, or control information associated with various information channels (e.g. control channels, data channels, and information related to signals for non-coherent transmission diversity communications). Information may be passed on to other components of the device 1705. The receiver 1710 may be an example of aspects of the transceiver 1920 described with reference to FIG. 19. The receiver 1710 may utilize a single antenna or a set of antennas (e.g. for MIMO communications).

The UE communications manager 1715 may include a receiving component 1720, a correlation component 1725, a summation component 1730, a repetition component 1735, a selection component 1740, and a mapping component 1745.

The receiving component 1720 may receive, at N receive antennas, a resource block of resource elements, wherein the resource block is transmitted from M transmit antennas (i.e. N and M are greater than 1). The correlation component 1725 may, for each of the N receive antennas, perform a correlation of received bits of the resource block with respective sequences from respective M codebooks to provide respective correlations, and performing a summation of the respective correlations to obtain a correlation result. The summation component 1730 may perform a summation of respective correlation results obtained (from the correlation component 1725) for the N receive antennas to provide a correlated output.

The repetition component 1735 may instruct the correlation component 1725 and the summation component 1730 to repeat the associated operations therein for each of I sequences from the respective M codebooks to obtain respective correlated outputs associated with respective I sequences.

The selection component 1740 may select a correlated output, from the respective correlated outputs (provided by the summation component 1730 in respect of the each of I sequences from the first codebook and the each of I sequences from the second codebook), with the maximum value to determine the corresponding i-th sequence that enables the selected correlated output. The mapping component 1745 may map the determined i-th sequence to a corresponding set of I bits, according to a predetermined mapping. The corresponding set of I bits (being mapped to) are regarded as the set of I bits of information stream detected for the demodulation.

The transmitter 1750 may transmit signals generated by other components of the device 1705. In some examples, the transmitter 1750 may be collocated with the receiver 1710 in a transceiver component. For example, the transmitter 1750 may be an example of aspects of the transceiver 1920 described with reference to FIG. 19. The transmitter 1750 may utilize a single antenna or a set of antennas (e.g. for MIMO communications).

Figure 18:
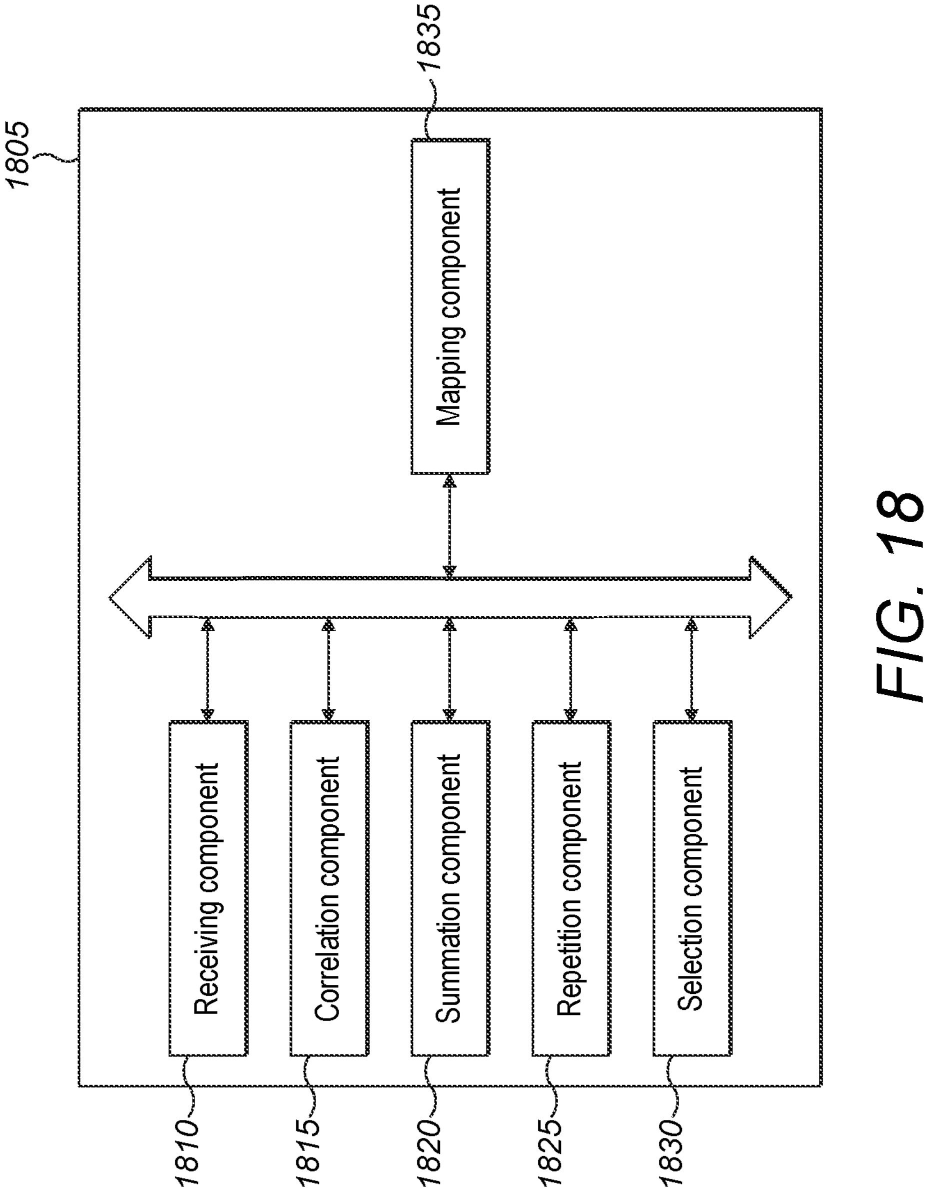
FIG. 18 is a block diagram of a communications manager that supports non-coherent transmission diversity communications, in accordance with aspects of the present disclosure.

FIG. 18 is a block diagram of a communications manager 1805 that supports non-coherent transmission diversity communications, in accordance with aspects of the present disclosure. The communications manager 1805 may be an example of aspects of a UE communications manager 1615, a UE communications manager 1715, or a UE communications manager 1910 described herein. The communications manager 1805 may include a receiving component 1810, a correlation component 1815, a summation component 1820, a repetition component 1825, a selection component 1830, and a mapping component 1835. Each of these components may communicate, directly or indirectly, with one another (e.g. via one or more buses).

The receiving component 1810 may receive, at N receive antennas, a resource block of resource elements, wherein the resource block is transmitted from M transmit antennas (i.e. N and M are greater than 1). The correlation component 1815 may, for each of the N receive antennas, perform a correlation of received bits of the resource block with respective sequences from respective M codebooks to provide respective correlations, and performing a summation of the respective correlations to obtain a correlation result. The summation component 1820 may perform a summation of respective correlation results obtained (from the correlation component 1815) for the N receive antennas to provide a correlated output. The repetition component 1825 may instruct the correlation component 1815 and the summation component 1820 to repeat the associated operations therein for each of I sequences from the respective M codebooks to obtain respective correlated outputs associated with respective I sequences.

The selection component 1830 may select a correlated output, from the respective correlated outputs (provided by the summation component 1820 in respect of the each of I sequences from the respective M codebooks), with the maximum value to determine the corresponding i-th sequence that enables the selected correlated output. The mapping component 1835 may map the determined i-th sequence to a corresponding set of I bits, according to a predetermined mapping. The corresponding set of I bits (being mapped to) are regarded as the set of I bits of information stream detected for the demodulation.

Figure 19:
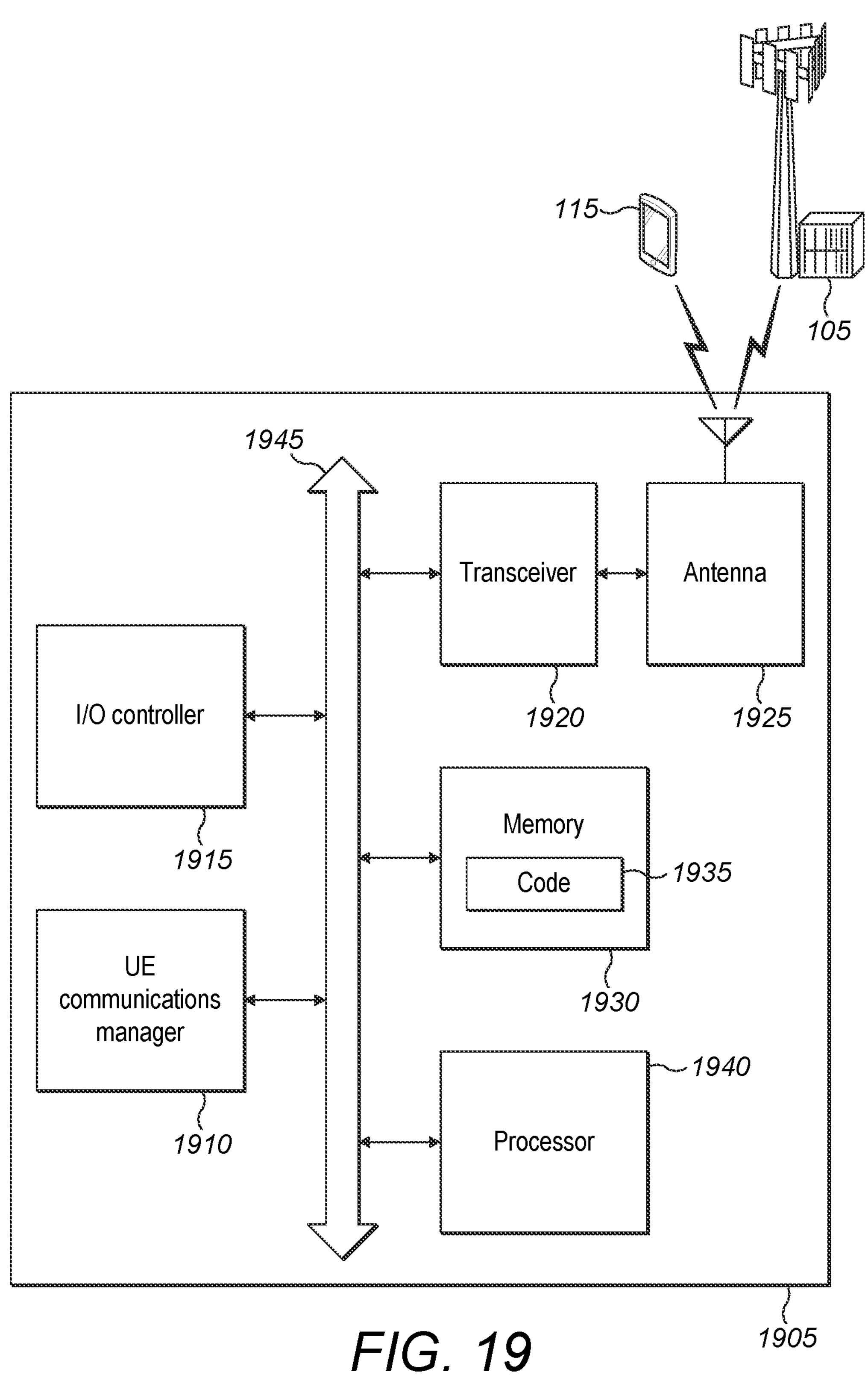
FIG. 19 is a diagram of a system including a device that supports non-coherent transmission diversity communications, in accordance with aspects of the present disclosure.

FIG. 19 is a diagram of a system including a device 1905 that supports non-coherent transmission diversity communications, in accordance with aspects of the present disclosure. The device 1905 may be an example of, or include the components of device 1605, device 1705, or a UE 115. The device 1905 may include components for bi-directional voice and data communications including components for transmitting and receiving communications, including a UE communications manager 1910, an input/output (I/O) controller 1915, a transceiver 1920, an antenna 1925, memory 1930, and a processor 1940. These components may be in electronic communication via one or more buses (e.g. bus 1945).

The UE communications manager 1910 may be configured to perform the following operations: (i) receiving, at N receive antennas, a resource block of resource elements, wherein the resource block is transmitted from M transmit antennas (i.e. N and M are greater than 1); (ii) for each of the N receive antennas, performing a correlation of received bits of the resource block with respective sequences from respective M codebooks, and performing a summation of the respective correlations to obtain a correlation result; (iii) performing a summation of respective correlation results obtained for the N receive antennas to provide a correlated output; (iv) repeating operations (ii) to (iii) for each of I sequences from the respective M codebooks to obtain respective correlated outputs associated with respective I sequences; (v) selecting a correlated output, from the respective correlated outputs, with the maximum value to determine the corresponding i-th sequence that enables the selected correlated output; and (vi) mapping the determined i-th sequence to a corresponding set of I bits, according to a predetermined mapping. The corresponding set of I bits are regarded as the set of I bits of information stream detected for the demodulation.

The I/O controller 1915 may manage input and output signals for the device 1905. The I/O controller 1915 may also manage peripherals not integrated into the device 1905. In some implementations, the I/O controller 1915 may represent a physical connection or port to an external peripheral. In some implementations, the I/O controller 1915 may utilize an operating system such as iOS®, ANDROID®, MS-DOS®, MS-WINDOWS®, OS/2R, UNIX®, LINUX®, or another known operating system. In other cases, the I/O controller 1915 may represent or interact with a modem, a keyboard, a mouse, a touchscreen, or a similar device. In some implementations, the I/O controller 1915 may be implemented as part of a processor. In some implementations, a user may interact with the device 1905 via the I/O controller 1915 or via hardware components controlled by the I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas. In some implementations, the device 1905 may include a single antenna 1925. However, in some implementations the device 1905 may have more than one antenna 1925, which may be capable of concurrently transmitting or receiving multiple wireless transmissions (e.g. for MIMO communications).

The memory 1930 may include random access memory (RAM) and read only memory (ROM). The memory 1930 may store computer-readable, computer-executable code 1935 including instructions that, when executed, cause the processor to perform various functions described herein. In some implementations, the memory 1930 may contain, among other things, a basic I/O system (BIOS) which may control basic hardware or software operation such as the interaction with peripheral components or devices.

The processor 1940 may include an intelligent hardware device, (e.g. a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some implementations, the processor 1940 may be configured to operate a memory array using a memory controller. In other cases, a memory controller may be integrated into the processor 1940. The processor 1940 may be configured to execute computer-readable instructions stored in a memory (for example, the memory 1930) to cause the device 1905 to perform various functions (for example, functions or tasks supporting non-coherent transmission diversity communications).

The computer-executable code 1935 may include instructions to implement aspects of the present disclosure, including instructions to support wireless communications. The computer-executable code 1935 may be stored in a non-transitory computer-readable medium such as system memory or other type of memory. In some implementations, the code 1935 may not be directly executable by the processor 1940 but may cause a computer (for example, when compiled and executed) to perform functions described herein.

Figure 20:
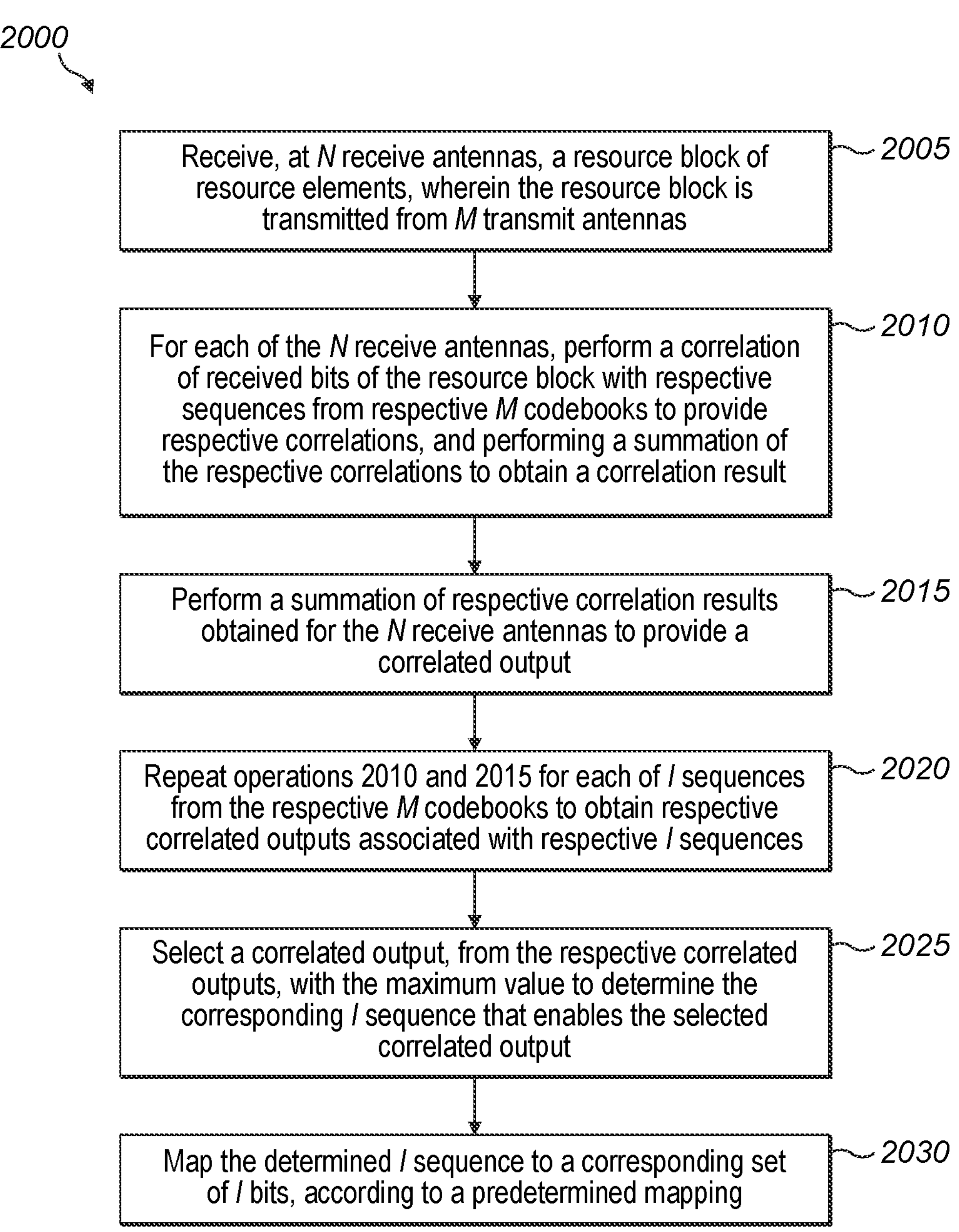
FIG. 20 is a flowchart illustrating a method that support transmission of a set of I bits of information stream using non-coherent transmission diversity communications, in accordance with aspects of the present disclosure.

FIG. 20 is a flowchart illustrating a method 2000 for demodulation of a set of I bits of information stream using non-coherent transmission diversity communications, in accordance with aspects of the present disclosure. The operations of method 2000 may be implemented by a UE 115, or its components. For example, the operations of method 2000 may be performed by a UE communications manager as described with reference to FIGS. 16-19. In some examples, a UE 115 may execute a set of instructions to control the functional elements of the UE 115 to perform the functions described below. Additionally or alternatively, a UE 115 may perform aspects of the functions described below using special-purpose hardware.

Notwithstanding, it is also highlighted that the operations of method 2000 may be implemented by a base station 105, or its components equivalent to the discussed in relation to the UE 115.

At 2005, the UE 115 may receive, at N receive antennas, a resource block of resource elements, wherein the resource block is transmitted from M transmit antennas (i.e. N and M are greater than 1). The operations of 2005 may be performed according to the methods described herein. In some examples, aspects of the operations of 2005 may be performed by a receiving component as described with reference to FIGS. 17-18.

At 2010, the UE 115 may, for each of the N receive antennas, perform a correlation of received bits of the resource block with respective sequences from respective M codebooks to provide respective correlations, and thereafter performing a summation of the respective correlations to obtain a correlation result. The operations of 2010 may be performed according to the methods described herein. In some examples, aspects of the operations of 2010 may be performed by a correlation component as described with reference to FIGS. 17-18.

At 2015, the UE 115 may perform a summation of respective correlation results obtained for the N receive antennas to provide a correlated output. The operations of 2015 may be performed according to the methods described herein. In some examples, aspects of the operations of 2015 may be performed by a summation component as described with reference to FIGS. 17-18.

At 2020, the UE 115 may repeat operations 2010 and 2015 for each of I sequences from the respective M codebooks to obtain respective correlated outputs associated with respective I sequences. The operations of 2020 may be performed according to the methods described herein. In some examples, aspects of the operations of 2020 may be performed by a repetition component as described with reference to FIGS. 17-18.

At 2025, the UE 115 may select a correlated output, from the respective correlated outputs, with the maximum value to determine the corresponding i-th sequence that enables the selected correlated output. The operations of 2025 may be performed according to the methods described herein. In some examples, aspects of the operations of 2025 may be performed by a selection component as described with reference to FIGS. 17-18.

At 2030, the UE 115 may map the determined i-th sequence to a corresponding set of I bits, according to a predetermined mapping. The corresponding set of I bits (being mapped to) are regarded as the set of I bits of information stream detected for the demodulation. The operations of 2030 may be performed according to the methods described herein. In some examples, aspects of the operations of 2030 may be performed by a mapping component as described with reference to FIGS. 17-18.

It is to be appreciated that if the set of I bits of information stream to be demodulated comprise UCI, the afore described with reference to FIGS. 16-20 are then to be understood, mutatis mutandis, in the context of equivalent respective aspects or components of a base station 105 (rather than the UE 115).

In some implementations, the operations of the method 2000 may be programmed into, and stored as corresponding computer-readable code 1935.

Figure 21:
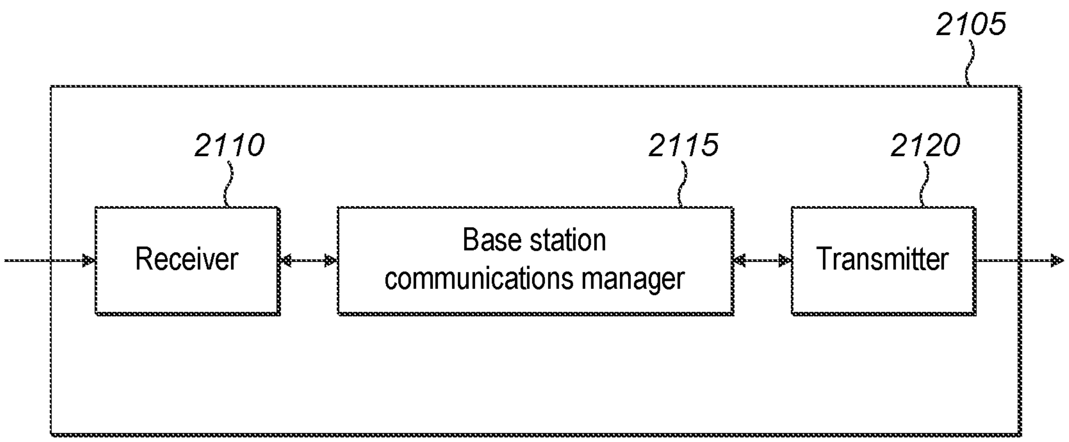
FIGS. 21 and 22 are block diagrams of devices that support non-coherent transmission diversity communications, in accordance with aspects of the present disclosure.

FIG. 21 is block diagram of a device 2105 that supports non-coherent transmission diversity communications, in accordance with aspects of the present disclosure. The device 2105 may be an example of aspects of a base station 105. The device 2105 may include a receiver 2110, a base station communications manager 2115, and a transmitter 2120. The base station communications manager 2115 can be implemented, at least in part, by one or both of a modem and a processor. Each of these components may be in communication with one another (e.g. via one or more buses).

The receiver 2110 may receive information such as packets, user data, or control information associated with various information channels (e.g. control channels, data channels, or information related to signals for non-coherent transmission diversity communications). Information may be passed on to other components of the device 2105. The receiver 2110 may be an example of aspects of the transceiver 2420 described with reference to FIG. 24. The receiver 2110 may utilize a single antenna or a set of antennas (e.g. for MIMO communications).

The base station communications manager 2115 may derive a set of P matrices, each matrix in the set of P matrices comprises M vectors each of length d; optionally encode a set of I bits of information stream to be transmitted; chop the I bits of (encoded) information stream into respective segments each having J bits of information stream, and each segment is configured to be of equal length $\log_2(P)$, wherein $\log_2(P)=J$, and $J<I$; map, based on a value represented by the associated J bits of each segment, each segment to a matrix in the set of the P matrices; and transmit, across M transmit antennas, the respective matrices mapped to the respective segments using at least a subset of assigned resources of a resource block to communicate the set of I bits of information stream.

Figure 24:
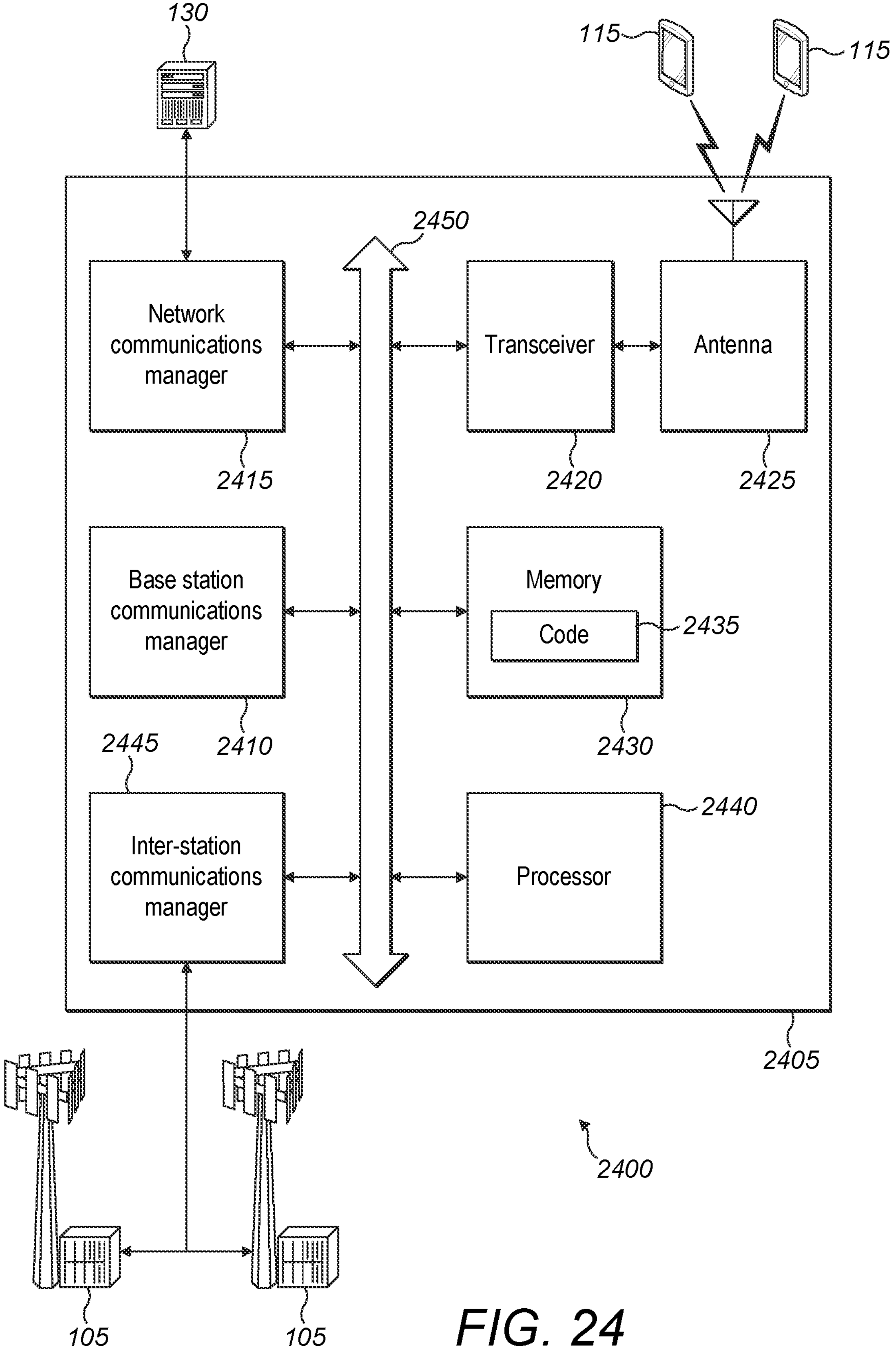
FIG. 24 is a diagram of a system including a device that supports non-coherent transmission diversity communications, in accordance with aspects of the present disclosure.

The base station communications manager 2115 may be an example of aspects of the base station communications manager 2410 described herein with reference to FIG. 24.

The transmitter 2120 may transmit signals generated by other components of the device 2105. In some examples, the transmitter 2120 may be collocated with a receiver 2110 in a transceiver component. For example, the transmitter 2120 may be an example of aspects of the transceiver 2420 described with reference to FIG. 24. The transmitter 2120 may utilize a single antenna or a set of antennas (e.g. for MIMO communications).

Notwithstanding, if the set of I bits of information stream comprise UCI, the afore described with reference to FIG. 21 (and the below with reference to FIGS. 22-25) may alternatively be understood, mutatis mutandis, in the context of equivalent respective aspects or components of a UE 115 (rather than the base station 105).

Figure 22:
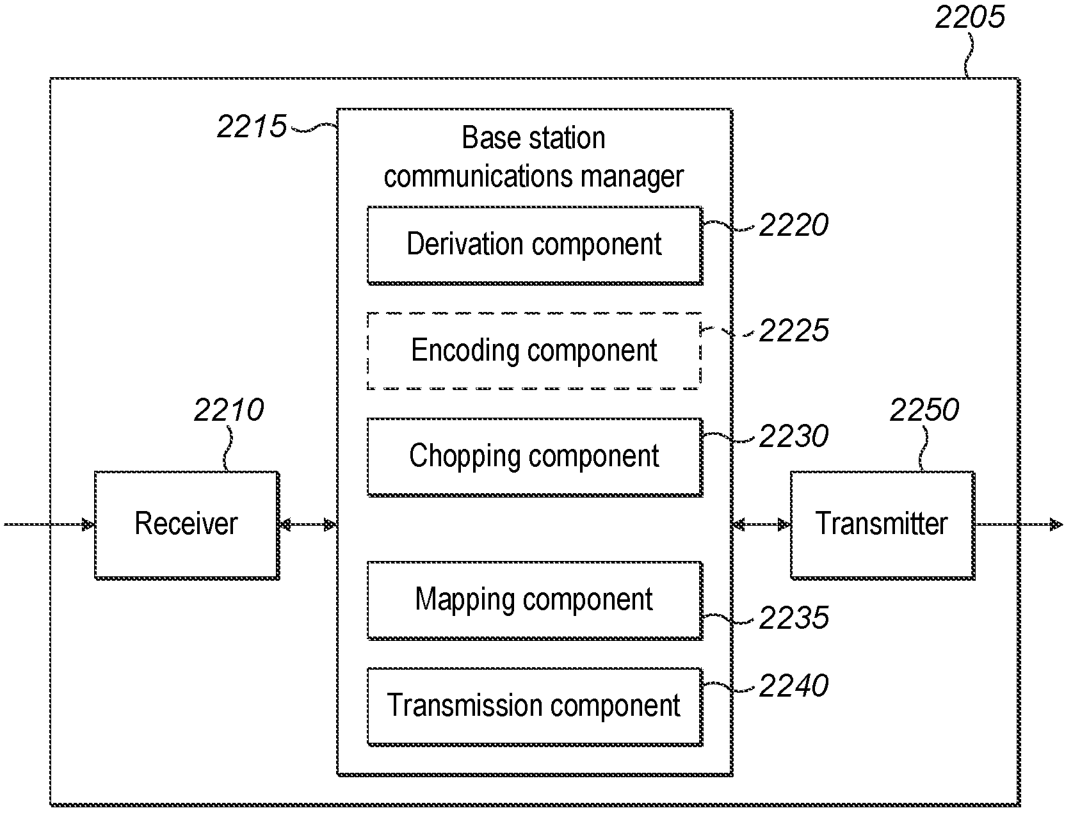

FIG. 22 is block diagram of a device 2205 that supports non-coherent transmission diversity communications, in accordance with aspects of the present disclosure. The device 2205 may be an example of aspects of a device 1105, or a base station 105. The device 2205 may include a receiver 2210, a base station communications manager 2215, and a transmitter 2250. The base station communications manager 2215 can be implemented, at least in part, by one or both of a modem and a processor. Each of these components may be in communication with one another (e.g. via one or more buses).

The receiver 2210 may receive information such as packets, user data, or control information associated with various information channels (e.g. control channels, data channels, or information related to signals for non-coherent transmission diversity communications). Information may be passed on to other components of the device 2205. The receiver 2210 may be an example of aspects of the transceiver 2420 described with reference to FIG. 24. The receiver 2210 may utilize a single antenna or a set of antennas (e.g. for MIMO communications).

The base station communications manager 2215 may include a derivation component 2220, an optional encoding component 2225, a chopping component 2230, a mapping component 2235, and a transmission component 2240.

The derivation component 2220 may derive a set of P matrices, each matrix in the set of P matrices comprises M vectors each of length d. The encoding component 2225 may encode a set of I bits of information stream to be transmitted. The chopping component 2230 may chop the I bits of (encoded) information stream into respective segments each having J bits of information stream, and each segment is configured to be of equal length $\log_2(P)$, wherein $\log_2(P)=J$, and $J<I$. The mapping component 2235 may map, based on a value represented by the associated J bits of each segment, each segment to a matrix in the set of the P matrices. The transmission component 2240 may transmit, across M transmit antennas, the respective matrices mapped to the respective segments using at least a subset of assigned resources of a resource block to communicate the set of I bits of information stream.

The transmitter 2250 may transmit signals generated by other components of the device 2205. In some examples, the transmitter 2250 may be collocated with the receiver 2210 in a transceiver component. For example, the transmitter 2250 may be an example of aspects of the transceiver 2420 described with reference to FIG. 24. The transmitter 2250 may utilize a single antenna or a set of antennas (e.g. for MIMO communications).

Figure 23:
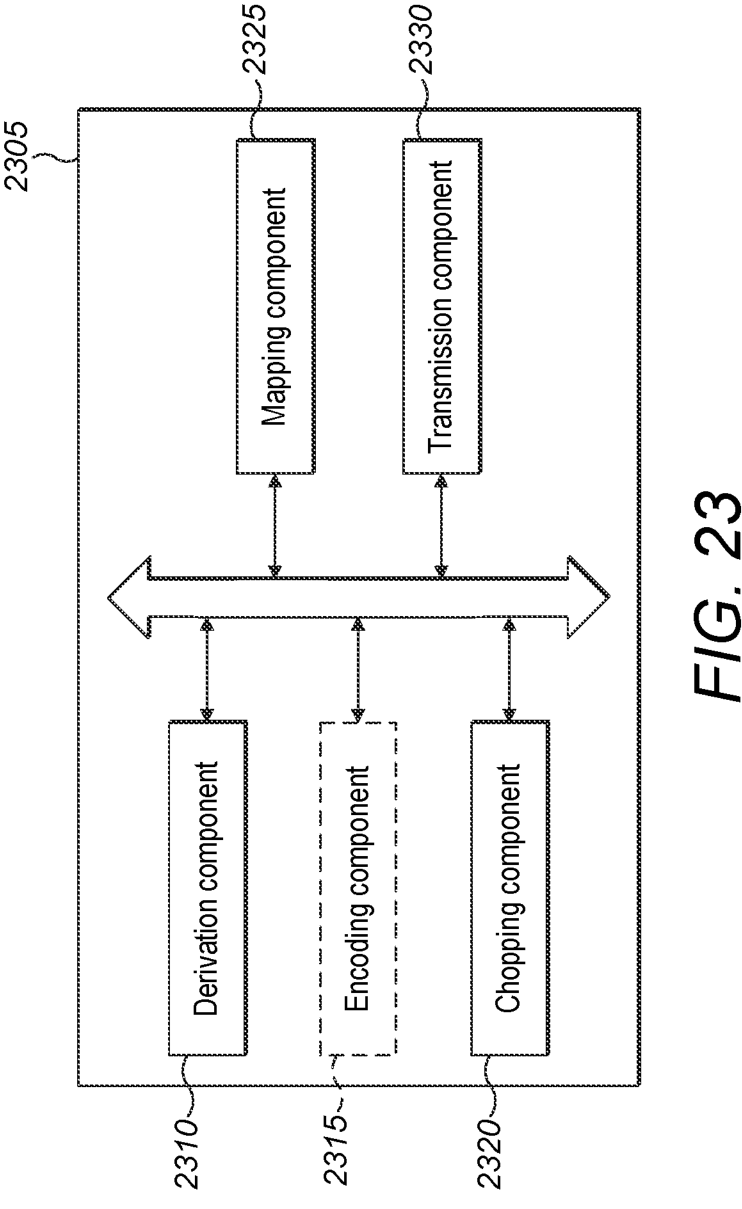
FIG. 23 is a block diagram of a communications manager that supports non-coherent transmission diversity communications, in accordance with aspects of the present disclosure.

FIG. 23 is a block diagram of a communications manager 2305 that supports non-coherent transmission diversity communications, in accordance with aspects of the present disclosure. The communications manager 2305 may be an example of aspects of a base station communications manager 2115, a base station communications manager 2215, or a base station communications manager 2410 described herein. The communications manager 2305 may include a derivation component 2310, an optional encoding component 2315, a chopping component 2320, a mapping component 2325, and a transmission component 2330. Each of these components may communicate, directly or indirectly, with one another (e.g. via one or more buses).

The derivation component 2310 may derive a set of P matrices, each matrix in the set of P matrices comprises M vectors each of length d. The encoding component 2315 may encode a set of I bits of information stream to be transmitted. The chopping component 2320 may chop the I bits of (encoded) information stream into respective segments each having J bits of information stream, and each segment is configured to be of equal length $\log_2(P)$, wherein $\log_2(P)=J$, and $J<I$. The mapping component 2325 may map, based on a value represented by the associated J bits of each segment, each segment to a matrix in the set of the P matrices. The transmission component 2330 may transmit, across M transmit antennas, the respective matrices mapped to the respective segments using at least a subset of assigned resources of a resource block to communicate the set of I bits of information stream.

FIG. 24 is a diagram of a system 2400 including a device 2405 that supports non-coherent transmission diversity communications, in accordance with aspects of the present disclosure. The device 2405 may be an example of, or include the components of device 2105, device 2205, or a base station 105. The device 2405 may include components for bi-directional voice and data communications including components for transmitting and receiving communications, including a base station communications manager 2410, a network communications manager 2415, a transceiver 2420, an antenna 2425, memory 2430, a processor 2440, and an inter-station communications manager 2445. These components may be in electronic communication via one or more buses (e.g. bus 2450).

The base station communications manager 2410 may derive a set of P matrices, each matrix in the set of P matrices comprises M vectors each of length d; optionally encode a set of I bits of information stream to be transmitted; chop the I bits of (encoded) information stream into respective segments each having J bits of information stream, and each segment is configured to be of equal length $\log_2(P)$, wherein $\log_2(P)=J$, and $J<I$; map, based on a value represented by the associated J bits of each segment, each segment to a matrix in the set of the P matrices; and transmit, across M transmit antennas, the respective matrices mapped to the respective segments using at least a subset of assigned resources of a resource block to communicate the set of I bits of information stream.

The network communications manager 2415 may manage communications with the core network (e.g. via one or more wired backhaul links). For example, the network communications manager 2415 may manage the transfer of data communications for client devices, such as one or more UEs 115.

The transceiver 2420 may communicate bi-directionally, via one or more antennas, wired, or wireless links as described above. For example, the transceiver 2420 may represent a wireless transceiver and may communicate bi-directionally with another wireless transceiver. The transceiver 2420 may also include a modem to modulate the packets and provide the modulated packets to the antennas for transmission, and to demodulate packets received from the antennas. In some implementations, the device 2405 may include a single antenna 2425. However, in some implementations the device 2405 may have more than one antenna 2425, which may be capable of concurrently transmitting or receiving multiple wireless transmissions (e.g. for MIMO communications).

The memory 2430 may include RAM, ROM, or a combination thereof. The memory 2430 may store computer-readable code 2435 including instructions that, when executed by a processor (e.g. the processor 2440) cause the device to perform various functions described herein. In some implementations, the memory 2430 may contain, among other things, a BIOS which may control basic hardware or software operation such as the interaction with peripheral components or devices.

The processor 2440 may include an intelligent hardware device, (e.g. a general-purpose processor, a DSP, a CPU, a microcontroller, an ASIC, an FPGA, a programmable logic device, a discrete gate or transistor logic component, a discrete hardware component, or any combination thereof). In some implementations, the processor 2440 may be configured to operate a memory array using a memory controller. In some implementations, a memory controller may be integrated into processor 2440. The processor 2440 may be configured to execute computer-readable instructions stored in a memory (e.g. the memory 2430) to cause the device 2405 to perform various functions (e.g. functions or tasks supporting non-coherent transmission diversity communications).

The inter-station communications manager 2445 may manage communications with other base station 105, and may include a controller or scheduler for controlling communications with UEs 115 in cooperation with other base stations 105. For example, the inter-station communications manager 2445 may coordinate scheduling for transmissions to UEs 115 for various interference mitigation techniques such as beamforming or joint transmission. In some examples, the inter-station communications manager 2445 may provide an X2 interface within an LTE/LTE-A wireless communication network technology to provide communication between base stations 105.

The computer-readable code 2435 may include instructions to implement aspects of the present disclosure, including instructions to support non-coherent transmission diversity communications. The computer-readable code 2435 may be stored in a non-transitory computer-readable medium such as system memory or other type of memory. In some implementations, the computer-readable code 2435 may not be directly executable by the processor 2440 but may cause a computer (e.g. when compiled and executed) to perform functions described herein.

Figure 25:
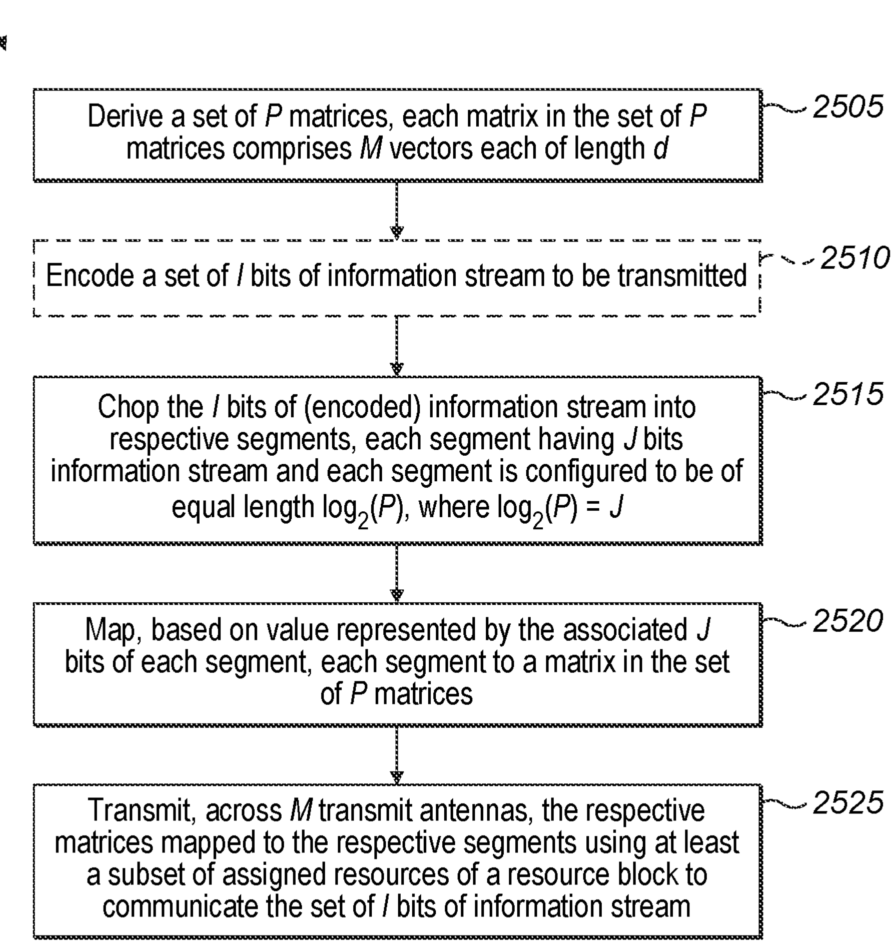
FIG. 25 is a flowchart illustrating a method that support transmission of a set of I bits of information stream using non-coherent transmission diversity communications, in accordance with aspects of the present disclosure.

FIG. 25 is a flowchart illustrating a method 2500 that support transmission of a set of I bits of information stream using non-coherent transmission diversity communications, in accordance with aspects of the present disclosure. The operations of method 2500 may be implemented by a base station 105, or its components. For example, the operations of method 2500 may be performed by a base station communications manager as described with reference to FIGS. 21-24. In some examples, a base station 105 may execute a set of instructions to control the functional elements of the base station 105 to perform the functions described below. Additionally or alternatively, a base station 105 may perform aspects of the functions described below using special-purpose hardware. Alternatively, the operations of method 2500 may also be implemented by a UE 115, or its equivalent components.

At 2505, the base station 105 may derive a set of P matrices, each matrix in the set of P matrices comprises M vectors each of length d. The operations of 2505 may be performed according to the methods described herein. In some examples, aspects of the operations of 2505 may be performed by a derivation component as described with reference to FIGS. 21-24.

At 2510, the base station 105 may optionally encode a set of I bits of information stream to be transmitted. The operations of 2510 may be performed according to the methods described herein. In some examples, aspects of the operations of 2510 may be performed by an encoding component as described with reference to FIGS. 21-24.

At 2515, the base station 105 may chop the I bits of (encoded) information stream into respective segments each having J bits of information stream, and each segment is configured to be of equal length $\log_2(P)$, wherein $\log_2(P)=J$, and $J<I$. The operations of 2515 may be performed according to the methods described herein. In some examples, aspects of the operations of 2515 may be performed by a chopping component as described with reference to FIGS. 21-24.

At 2520, the base station 105 may map, based on a value represented by the associated J bits of each segment, each segment to a matrix in the set of the P matrices. The operations of 2520 may be performed according to the methods described herein. In some examples, aspects of the operations of 2520 may be performed by a mapping component as described with reference to FIGS. 21-24.

At 2525, the base station 105 may transmit, across M transmit antennas, the respective matrices mapped to the respective segments using at least a subset of assigned resources of a resource block to communicate the set of I bits of information stream. The operations of 2525 may be performed according to the methods described herein. In some examples, aspects of the operations of 2525 may be performed by a transmission component as described with reference to FIGS. 21-24.

In some implementations, the operations of the method 2500 may be programmed into, and stored as corresponding computer-readable code 2435.

All of the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on".

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples". The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but to be accorded the broadest scope consistent with the principles and novel features disclosed herein.

The invention claimed is:

1. A method of transmission of a set of I bits of information stream, comprising:

selecting, from a pool of at least $2^I$ matrices, a matrix to uniquely represent the set of I bits of information stream, wherein each matrix of the pool is a set of M vectors, and wherein each vector of the set of M vectors corresponds to a respective transmit antenna of a set of M transmit antennas and is of length D; and transmitting a resource block across the set of M transmit antennas, wherein respective vectors of the set of M vectors are transmitted on the corresponding transmit antennas of the set of M transmit antennas and based at least in part on mapping respective entries of the respective vectors to respective resource elements of the resource block.

2. The method of claim 1, wherein each matrix of the pool is derived from at least one Gold sequence.

3. The method of claim 1, wherein each matrix of the pool is derived from a Gold sequence of length D multiplied by a matrix Q of dimension D×M, wherein the multiplication expands the Gold sequence of length D into a matrix of dimension D×M.

4. The method of claim 3, wherein D is defined to be 168 and M is defined to be 2, and the matrix Q is defined as:

$$Q = \begin{bmatrix} 1 & 1 \\ 1 & -1 \\ \vdots & \vdots \\ 1 & 1 \\ 1 & -1 \end{bmatrix}.$$

5. The method of claim 1, wherein each matrix of the pool is derived by selecting M unique Gold sequences from a plurality of Gold sequences, and each Gold sequence is of the length D.

6. The method of claim 1, wherein each matrix of the pool is derived from a Gold sequence of length R being of 2D, which is divided into M parts of the length D respectively to obtain a respective matrix.

7. The method of claim 3, wherein D is configured to correspond to a number of resource elements in the resource block across all available orthogonal frequency-division multiplexing (OFDM) symbols.

8. The method of claim 1, wherein each matrix of the pool comprises a plurality of sub-matrices, each sub-matrix is derived from selecting half of the columns of an associated block matrix having 2M columns; and wherein the associated block matrix is derived from the Kronecker product of an associated entry in a Gold sequence of length S with an orthogonal or a non-orthogonal matrix T having 2M columns, in which S<D; and wherein the selection of half of the columns of the associated block matrix is based on a value of the associated entry in the Gold sequence used for Kronecker product with the orthogonal or the non-orthogonal matrix T, and the value is 1 or 0.

9. The method of claim 8, wherein the non-orthogonal matrix T is generated by omitting at least one row of an orthogonal matrix.

10. The method of claim 8, wherein the length S of the Gold sequence multiplied by the number of rows in the orthogonal or the non-orthogonal matrix T provides a matrix of dimension D×M.

11. The method of claim 1, wherein each matrix of the pool comprises a plurality of sub-matrices, each sub-matrix is derived from selecting half of the columns of an associated block matrix having 2M columns; and wherein the associated block matrix is derived from the Kronecker product of an associated entry in a Gold sequence of length S with a matrix T with co-phase and has 2M columns, in which S<D, and half of the 2M columns of the matrix T are equal to a remaining half of the 2M columns of the matrix T multiplied with a common phase factor; and wherein the selection of half of the columns of the associated block matrix is based on a value of the associated entry in the Gold sequence used for Kronecker product with the matrix T, and the value is 1 or 0.

12. The method of claim 11, wherein the common phase factor includes −1.

13. The method of claim 11, wherein the length S of the Gold sequence multiplied by the number of rows in the matrix T with co-phase provides a matrix of dimension D×M.

14. The method of claim 1, wherein transmitting the resource block across the set of M transmit antennas further comprises:

mapping each entry of each vector to a resource element of the resource block which includes being configured with D resource elements; and transmitting each vector using a different transmit antenna of the set of M transmit antennas.

15. The method of claim 1, wherein each matrix of the pool is derived, at least in part, by sub-sampling D rows of a larger matrix of dimension L×M, in which L>>D.

16. The method of claim 15, wherein deriving each matrix of the pool further comprises:

multiplying a diagonal matrix of dimension D×D with a unitary matrix of dimension D x M to derive an associated matrix, wherein the multiplication is based on the equation:

$C_l=\theta^{l-1}C_1$, in which $C_l$ is the associated matrix derived, $\theta$ is the diagonal matrix, l is an integer, and $C_1$ is the unitary matrix.

17. The method of claim 16, wherein the diagonal matrix includes diagonal elements defined as $\{e^{i2\pi u_1/L}, e^{i2\pi u_2/L}, \ldots, e^{i2\pi u_t/L}, \ldots, e^{i2\pi u_D/L}\}$ in which $u_t$ is the t-th index of a set of integers, where each integer in the set of integers is selected from the range [0, L−1].

18. The method of claim 15, wherein the larger matrix includes a discrete Fourier transform (DFT) matrix.

19. The method of claim 1, wherein each vector of the set of M vectors is a Gold sequence of length D.

20. The method of claim 19, wherein M and D are respectively defined to be 2 and 168.

21. The method of claim 1, wherein the method is performed at a user equipment (UE), wherein the set of I bits of information stream comprise uplink control information (UCI), and the selection of the matrix from the pool of at least $2^I$ matrices to uniquely represent the set of I bits of information stream is based on the UCI.

22. The method of claim 21, wherein the UCI is included in a transport block of data and wherein the data is modulated directly to the resource block.

23. An apparatus for transmission of a set of I bits of information stream, comprising:

at least one processor;

at least one memory communicatively coupled to the at least one processor; and executable instructions code stored in the at least one memory, which when executed by the at least one processor, cause the at least one processor to:

select, from a pool of at least $2^I$ matrices, a matrix to uniquely represent the set of I bits of information stream, wherein each matrix of the pool is a set of M vectors, and wherein each vector of the set of M vectors corresponds to a respective transmit antenna of a set of M transmit antennas and is of length D; and transmit a resource block across the set of M transmit antennas, wherein respective vectors of the set of M vectors are transmitted on the corresponding transmit antennas of the set of M transmit antennas and based at least in part on mapping respective entries of the respective vectors to respective resource elements of the resource block.

24. The apparatus of claim 23, wherein each matrix of the pool is derived from at least one Gold sequence.

25. The apparatus of claim 23, wherein each matrix of the pool is derived from a Gold sequence of length D multiplied by a matrix Q of dimension D×M, wherein the multiplication expands the Gold sequence of length D into a matrix of dimension D×M.

26. The apparatus of claim 25, wherein D is defined to be 168 and M is defined to be 2, and the matrix Q is defined as:

$$Q=\begin{bmatrix} 1 & 1 \\ 1 & -1 \\ \vdots & \vdots \\ 1 & 1 \\ 1 & -1 \end{bmatrix}.$$

27. The apparatus of claim 23, wherein each matrix of the pool is derived by selecting M unique Gold sequences from a plurality of Gold sequences, and each Gold sequence is of length D.

28. The apparatus of claim 23, wherein each matrix of the pool is derived from a Gold sequence of length R being of 2D, which is divided into M parts of length D respectively to obtain an associated matrix.

29. The apparatus of claim 25, wherein D is configured to correspond to a number of resource elements in the resource block across all available orthogonal frequency-division multiplexing (OFDM) symbols.

30. A wireless device for wireless communications, comprising:

means for selecting, from a pool of at least $2^I$ matrices, a matrix to uniquely represent a set of I bits of information stream, wherein each matrix of the pool is a set of M vectors, and wherein each vector of the set of M vectors corresponds to a respective transmit antenna of a set of M transmit antennas and each vector is of length D; and means for transmitting a resource block across the set of M transmit antennas, wherein respective vectors of the set of M vectors are transmitted on the corresponding transmit antennas of the set of M transmit antennas and based at least in part on mapping respective entries of the respective vectors to respective resource elements of the resource block.

* * * * *